(12) United States Patent
Berg et al.

(10) Patent No.: US 8,392,498 B2
(45) Date of Patent: Mar. 5, 2013

(54) DISTRIBUTION OF CONTENT AND BEHAVIOR TO DISPARATE PLATFORMS

(75) Inventors: Johannes Berg, Vasa (FI); Marcus Wikars, Vasa (FI); Magnus Holtlund, Vasa (FI)

(73) Assignee: Lumi Technologies Limited, London (GB)

( * ) Notice: Subject to any disclaimer, the term of this patent is extended or adjusted under 35 U.S.C. 154(b) by 27 days.

(21) Appl. No.: 13/269,269

(22) Filed: Oct. 7, 2011

(65) Prior Publication Data

US 2012/0089669 A1  Apr. 12, 2012

Related U.S. Application Data

(60) Provisional application No. 61/391,272, filed on Oct. 8, 2010.

(51) Int. Cl.
 *G06F 15/16* (2006.01)
 *G06F 9/44* (2006.01)
(52) U.S. Cl. .......................... 709/202; 709/246; 717/170
(58) Field of Classification Search .................. 709/202, 709/246; 717/170
See application file for complete search history.

(56) References Cited

U.S. PATENT DOCUMENTS

| | | | |
|---|---|---|---|
| 6,191,821 B1 | 2/2001 | Kupnicki | |
| 6,684,383 B1 * | 1/2004 | Natori et al. | 717/116 |
| 6,745,011 B1 | 6/2004 | Hendrickson et al. | |
| 6,754,470 B2 | 6/2004 | Hendrickson et al. | |
| 7,408,502 B2 | 8/2008 | Percy et al. | |
| 7,516,204 B2 | 4/2009 | Kobayashi | |
| 7,523,191 B1 | 4/2009 | Thomas et al. | |
| 7,817,983 B2 | 10/2010 | Cassett et al. | |
| 7,873,353 B2 | 1/2011 | Kloba et al. | |
| 7,877,518 B2 | 1/2011 | Liu | |
| 7,907,966 B1 * | 3/2011 | Mammen | 715/765 |
| 2005/0075068 A1 * | 4/2005 | Goring et al. | 455/1 |
| 2005/0239551 A1 | 10/2005 | Griswold et al. | |
| 2005/0243784 A1 | 11/2005 | Fitzgerald et al. | |
| 2006/0080683 A1 * | 4/2006 | Anwar et al. | 719/332 |
| 2006/0142005 A1 * | 6/2006 | Takaluoma et al. | 455/435.1 |
| 2007/0220494 A1 | 9/2007 | Spooner | |
| 2007/0260475 A1 | 11/2007 | Bhanote | |
| 2007/0288662 A1 | 12/2007 | Chen | |
| 2008/0016176 A1 | 1/2008 | Leitner | |
| 2008/0059300 A1 | 3/2008 | Hamoui | |
| 2008/0098062 A1 | 4/2008 | Balia | |
| 2008/0195691 A1 | 8/2008 | Kloba et al. | |

(Continued)

FOREIGN PATENT DOCUMENTS

| | | |
|---|---|---|
| WO | WO 03/021463 | 3/2003 |
| WO | WO 2006/099586 | 9/2006 |

(Continued)

OTHER PUBLICATIONS

Compton, Georgina, "Search and Advisory Service Search Report—Sponsor Ref.: 45011; SAS Ref.: S1226401; Applicant: Apollo Mobile Ltd.", Jan. 20, 2011, 6 pages, Search and Advisory Service Intellectual Property Office, Newport, South Wales.

(Continued)

*Primary Examiner* — Patrice Winder
(74) *Attorney, Agent, or Firm* — Brown Rudnick LLP

(57) ABSTRACT

The invention generally relates to the delivery of content to devices of disparate platforms in executable format. The invention provides a way to create and deliver content and functionality to a number of different electronic devices having different platforms. In certain aspects, the invention provides an apparatus configured to receive a client application and a content application including functionality.

23 Claims, 5 Drawing Sheets

U.S. PATENT DOCUMENTS

| | | | |
|---|---|---|---|
| 2008/0201453 A1* | 8/2008 | Assenmacher | 709/219 |
| 2008/0215672 A1 | 9/2008 | Kloba et al. | |
| 2009/0005002 A1 | 1/2009 | Agarwal | |
| 2009/0119375 A1 | 5/2009 | Shenfield | |
| 2009/0150872 A1 | 6/2009 | Russell et al. | |
| 2009/0157792 A1 | 6/2009 | Fiatal | |
| 2009/0167553 A1 | 7/2009 | Hong et al. | |
| 2009/0203352 A1 | 8/2009 | Fordon et al. | |
| 2009/0228862 A1* | 9/2009 | Bertelrud et al. | 717/100 |
| 2009/0254851 A1 | 10/2009 | Scott et al. | |
| 2009/0271267 A1 | 10/2009 | Moukas et al. | |
| 2009/0282127 A1 | 11/2009 | Leblanc | |
| 2009/0300143 A1 | 12/2009 | Musa et al. | |
| 2010/0100445 A1 | 4/2010 | Flood et al. | |
| 2010/0115047 A1 | 5/2010 | Briscoe | |
| 2010/0121744 A1 | 5/2010 | Belz et al. | |
| 2010/0146133 A1 | 6/2010 | Perrin et al. | |
| 2010/0281475 A1* | 11/2010 | Jain et al. | 717/172 |
| 2010/0284380 A1 | 11/2010 | Banerjee | |
| 2011/0072371 A1* | 3/2011 | Segal et al. | 715/763 |
| 2011/0154305 A1* | 6/2011 | LeRoux et al. | 717/140 |
| 2011/0161912 A1* | 6/2011 | Eteminan et al. | 717/177 |
| 2012/0173986 A1 | 7/2012 | Jung | |
| 2012/0303399 A1* | 11/2012 | Rabstejnek | 705/7.12 |

FOREIGN PATENT DOCUMENTS

| | | |
|---|---|---|
| WO | WO 2008/042923 | 4/2008 |
| WO | 2008091101 A1 | 7/2008 |
| WO | 2009079794 | 7/2009 |

OTHER PUBLICATIONS

International Search Report and Written Opinion in International Patent Application PCT/US2011/055426, mailed Mar. 22, 2012 (8 pages).

International Search Report and Written Opinion for PCT/US2011/055440, May 31, 2012 (9 pages).

International Search Report and Written Opinion for PCT/US2011/055433, Jun. 1, 2012 (8 pages).

* cited by examiner

DISTRIBUTION OF CONTENT AND BEHAVIOR TO DISPARATE PLATFORMS

RELATED APPLICATION

This is application claims priority to U.S. Provisional Application Ser. No. 61/391,272, filed Oct. 8, 2010, which is herein incorporated by reference in its entirety.

FIELD OF THE INVENTION

The invention generally relates to the distribution of content to electronic devices and particularly to the delivery of content to devices of disparate platforms in executable format.

BACKGROUND

Portable handheld devices such as smartphones and tablet computing devices are widely distributed around the globe. Many individuals carry such a device, and use it for a variety of functions. These devices can use both cellular and Wi-Fi data networks and accordingly offer their users the ability to access content almost constantly. While the widespread usage of these devices offers obvious opportunities for gaming, entertainment, and other electronic media, the diversity of the devices presents challenge to producers who want to develop content for as wide an audience as possible.

Functionality and content is often delivered to these devices as or within executable files commonly called "apps". Apps can be installed onto smartphones and similar devices to provide a wide range of games, information, and interactivity. There are a large number of apps offering games, email, social networking, shopping, and media players, for example. Typically, apps are developed to operate within a specific platform, such as Java ME.

Many popular devices on the market support the Java ME platform. For example, a number of vendors offer Windows Mobile phones, which typically support Java ME. One widely distributed platform is Symbian, which also supports Java ME.

However, several popular devices do not support Java ME. For example, Java ME is not supported by iPhone, which instead requires Objective C. Many devices offer the Linux-based Android, which does not support Java ME. Similarly, Samsung's bada platform uses applications written in C++, using the bada SDK, and does not support Java ME.

With this diversity among electronic device platforms, creating content to reach all of their users requires creating a separate app for each, and having each user download, compile, or install the app to their device. A real difficulty arises when a producer wants to alter the content of the app, for instance to change its functionality. For example, if a producer had already produced and distributed a solitaire app, but wanted to add a new kind of solitaire game, the producer would create a new app, including the game, for each platform the producer wished to service. Users would then download and re-install the app to their device.

Similarly, a producer may want to deliver a fun electronic quiz during a series of sporting events. The quiz content may not be determinable ahead of time. For example, the producer may want to ask questions about the teams as they play the games, but the outcomes of games early in the series may determine which teams play later in the series. Users may be uninterested in the quiz if they must re-install the app before each game. Or, the producer may be unable to develop new apps for each platform in the time frame of the series.

SUMMARY

The invention provides a way to create and deliver content and functionality to a number of different electronic devices, even when the devices have different operating systems or platforms. End-users of the different devices will experience the content in real-time, as the content is sent from the server and functionalized on the device as-is, without any need for re-compilation or installation by the end-users. End-users will experience substantially the same content and functionality, regardless of the platform of their device. The architecture of the invention further allows changes to the content and behavior without requiring any installation-like steps by the end-users.

The invention provides a client/server content management system architecture which allows content producers to author a single version of content and behavior, called a content app, on a production server, and have that content app be distributable and executable on disparate client platforms.

Thus, users of different devices can experience content and participate in interactive electronic media in real-time. Regardless of the platform, users can play games, view media, or participate in surveys or group interactions like "tweeting", while all experiencing the same electronic functionality. Further, a producer can deliver new content in real-time, so that a large number of users can participate in electronic media that evolves in concert with real-world events. For example, users can play along with TV game show broadcasts or be polled on the likely winners as they watch an awards ceremony.

A content app may have its screen layout, screen navigation, and data content altered in real-time without requiring a client-side targeted recompilation, distribution, and install.

In certain aspects, the invention provides a system for distributing content including a production server coupled to a web interface and configured to allow, via the web interface, a producer to create a content application comprising functionality. The system includes a gateway server comprising a memory, one or more processors, and an input device, in communication with the production server and configured to receive the content application.

The system includes one or more client applications, sometimes called mobile applications or outer applications. The client application can be installed on an electronic device, where it functionalizes the content application.

By way of analogy, the client application is like an operating system within an operating system. A content application can be sent to a device without regard to the platform or operating system natively installed on that device. Components of the content application are recognized and executed by the client application.

In some embodiments, the client application can be authored by the producer. In some embodiments, the client application is an out-of-the-box application which gives a producer an environment within which to develop functionality. In some embodiments, the invention provides, one, two, or more different client applications or mobile applications, to be installed on a number of different electronic devices. The invention further provides that a number of different electronic devices can be configured to receive and install the mobile application.

When the gateway server receives a content application from the producer, the gateway server compiles it, resulting in the production of a compiled content app.

The web interface at the production server allows a producer to change the functionality to created modified content applications comprising modified functionality. When a content application is modified, one or more processors in the gateway server can, in real-time, receive the modified content application, compile it into a modified compiled content app, and send the modified compiled content app to the mobile devices. The mobile devices then, in real-time, execute the modified compiled content app such that the modified compiled content app provides the modified functionality to the end-user.

In certain embodiments, systems and methods of the invention can transform the content application as it is being compiled. A transformation can include, for example, translating the language that an end-user sees, or close-captioning a video. When this is performed, the content application becomes a transformed content app. While the content application is transformed, it can substantially simultaneously be compiled and streamed to a mobile device, thereby providing a translated version of the functionality to an end user.

In certain aspects, the invention provides an apparatus for distributing content including a memory and an input device in communication with the memory and configured to receive a client application and a content application comprising functionality. The apparatus can further include one or more processors in communication with the input device and the memory and configured to save the content application in the memory and assemble, based on the client application, one or more mobile applications which the one or more processors can then send to one or more mobile devices to be installed.

The one or more processors can compile the content application into one or more compiled content apps capable of being executed by the one or more installed mobile applications, such that the one or more compiled content apps can deliver the functionality to one or more end users.

Further, the one or more processors can be configured to send, responsive to the compiling step, the one or more compiled content apps to the one or more mobile devices.

In certain embodiments, the apparatus includes a core database, which can have either or both of a group or individual data item stored therein. The one or more processors can use items from the database when they process the content. For example, the one or more processors can write the content application together with a group data item into a dynamic section, which dynamic section can then be compiled into a compiled content app.

Similarly, the one or more processors can compile a dynamic section along with an individual data item into an individual compiled content app capable of being executed by an installed mobile application, such that the individual compiled content app can deliver an individualized form of functionality to an end-user.

The invention provides systems and methods capable of working with two or more electronic devices having different platforms including, for example, any of Java ME; iPhone; iOS; iPad; Android; Windows Mobile; Windows Phone; Blackberry OS; Symbian and bada.

The invention can be used to deliver content such as quizzes, surveys, polls, games, or result reports. For example, the functionality of the content can include a question and an input prompt. The one or more processors can be configured to compile, upon receipt of a content application, the content application into a compiled content app resulting in the compiled content app being executed by a plurality of mobile applications such that each mobile application can deliver, in real-time, to a separate end-user the question and the input prompt.

In some embodiments, the functionality includes the display of an element or the navigation from one screen to another.

In certain embodiments, there is a shared abstraction of Content Object types between client and server. In order to make the inner app executable, navigable and displayable on disparate client platforms, the various widgets and commands that constitute content app screen elements, navigation etc. exist as Java SE classes on the server, and they also exist as the equivalent Java ME or ported platform specific executables (e.g., Objective-C classes for iPhone) on the client side. The content app may thus be authored on the server, yet streamed and re-created as equivalent classes on the client, where they are interacted with by the outer app.

In certain embodiments, a content app of the invention consists of a plurality of binary packets, each plurality of binary packets comprising the functionality.

The invention provides systems and methods for aggregating inputs, such as collecting answers to a survey or quiz, and for sharing those inputs, for example with those users who gave the inputs. In certain embodiments, the invention provides an apparatus with one or more processors configured to cause a plurality of mobile devices to each substantially simultaneously receive input from a number of users and aggregate the inputs to create an aggregate result. The one or more processors can optionally store the aggregate result, for example as a group data item in the core database. The one or more processors can create a displayable object comprising the aggregate result and cause a plurality of mobile device to display the displayable object.

Systems and methods of the invention provide the ability to update content with new content. In certain embodiments, the functionality provided in the content app includes an alteration to an immediately preceding functionality. The one or more processors send the corresponding compiled content app to mobile devices causing mobile applications to replace the immediately preceding functionality with the functionality.

In certain aspects, the invention provides a computer-based method for distributing a content application, including, by means of one or more processors, performing the steps of receiving a content application comprising functionality and optionally saving the content application in the memory. The one or more processors facilitate assembling a plurality of mobile applications and sending the mobile applications to mobile devices to be installed. The method further includes, by means of the one or more processors, compiling the content application into compiled content apps capable of being executed by the installed mobile applications such that the compiled content apps can deliver the functionality to end-users.

In some embodiments, the method includes, responsive to the compiling step, sending the compiled content apps to mobile devices.

The method can further include storing, in a core database, either or both of a group or an individual data item, or any number of either, writing the content application and a group data item into a dynamic section, and compiling the dynamic section into the compiled content app. The method further includes compiling the dynamic section and an individual data item into an individual compiled content app capable of being executed by an installed mobile application such that the individual compiled content app can deliver an individualized form of the functionality to an end-user.

Mobile applications according to methods of the invention can be configured to operate on mobile devices, such that the devices include different platforms, which may be, for example, any of Java ME; iPhone; iOS; iPad; Android; Windows Mobile; Windows Phone; Blackberry OS; Symbian and bada.

In some embodiments, when the functionality includes a question and an input prompt, the method includes compiling, substantially simultaneously with the receiving of the content application by an input device, the content application into a compiled content app resulting in the compiled content app being executed by a plurality of mobile applications such that each mobile application can deliver, in real-time, to one of a number of end-users, the question and the input prompt.

When the functionality comprises the display of an element and the navigation from a screen to a second screen, the method includes supplying a plurality of content applications including different classes such as, for example, a Java SE class corresponding to the display and a Java SE class corresponding to the navigation, a Java ME class corresponding to the display and a Java ME class corresponding to the navigation, or an Objective-C class executable corresponding to the display and an Objective-C class executable corresponding to the navigation.

In some embodiments, the compiled content apps of methods of the invention each consist of a plurality of binary packets, each plurality of binary packets comprising the functionality.

The method can further include causing a plurality of mobile devices to each substantially simultaneously receive input from a plurality of users, aggregating the inputs to create an aggregate result, and optionally storing the aggregate result as a group data item in the core database. The method can further include creating a displayable object comprising the aggregate result and causing each mobile device to display the displayable object.

DETAILED DESCRIPTION

1. Overview

Figure 1:
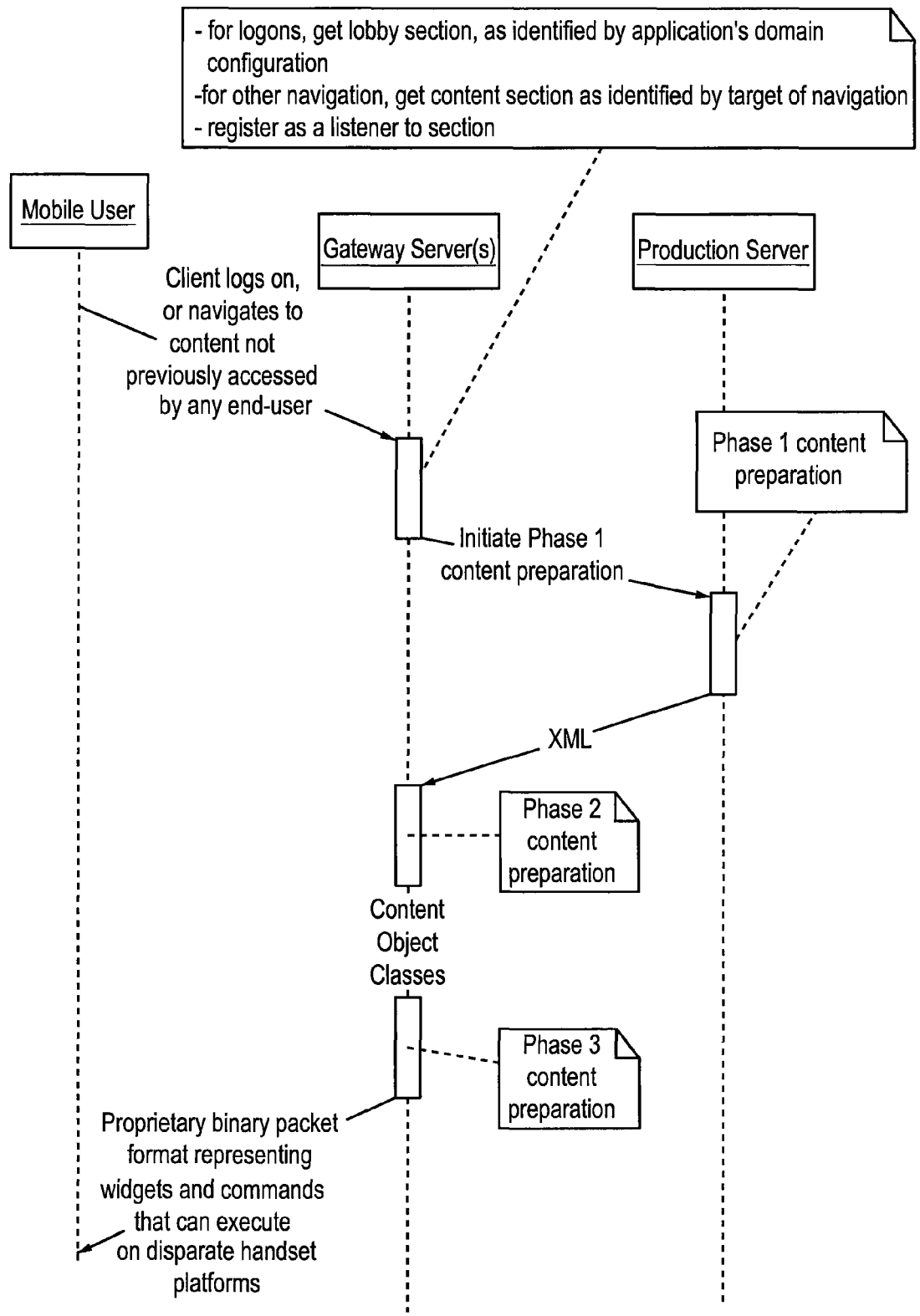
FIG. 1 illustrates multi-phase content preparation according to a logical sequence as a result of client navigation.

In certain aspects, the invention provides an architecture for client-server content management systems that enables a single version of content and behavior authored on the server to be distributable to and optimized for disparate client platforms. The architecture of the invention further allows changes to the content and behavior without requiring client-side recompilation A client/server content management system architecture is herein described, which allows content producers to author a single version of content and behavior (called a content app) on a production server, and have that content app be distributable and executable on disparate client platforms. A content app may have its screen layout, screen navigation, and data content altered in real-time without requiring a client-side targeted recompilation, distribution, and install.

The single version of the content app can furthermore be authored to have one or more of its constituent parts transformed in real-time, either on a per-platform or real-time client input basis. In certain embodiments, the real-time transformation includes language translation of widget labels or scaling of graphics.

In certain embodiments, a general client/server content management system architecture for handhelds is described.

Content and behavior delivered to the system's end-users starts out as server-side XML authored for, or by, a content producer. This content XML consists of elements that describe: behavior (e.g. navigation between screens, how to respond to user inputs etc.), appearance (e.g. aspects of screen layout, which actual widgets exist on screens etc.) and actual data (e.g. references to actual images, user input text data, authored text data, RSS feeds etc.). These elements in concert can be said to constitute "content and behavior".

This "content and behavior" can be thought of as an app within an app. The outer app is the (one-time authored) handset executable for a given platform (e.g. the Java ME client or iPhone app), while the "content and behavior" is the inner (or content) app, as created by the producer. The inner app is made executable and real-time distributable by a combination of a multi-phased content preparation process on the server side and interaction with the (outer) client executable.

Content delivered to clients begins on the server-side as one or more content sections comprising content. In certain embodiments, the objects are XML documents. These sections, for example, as XML, are written by a content producer. The sections include elements that describe behavior, including for example navigation between screens or how to respond to user inputs; appearance, including for example aspects of screen layout or which actual widgets exist on screens; and actual data, including for example references to actual images, user input text data, authored text data, or RSS feeds. These elements in concert can be said to constitute "content and behavior".

This "content and behavior" can be thought of as an app within an app. The outer app is the (one-time authored) handset executable for a given platform (e.g. the Java ME client or iPhone app), while the "content and behavior" is the inner (or content) app, as created by the producer. The inner app is made executable and real-time distributable by a combination of a multi-phased content preparation process on the server side and interaction with the (outer) client executable.

The invention supplies a content management system that provides full and real-time interactivity on most types of mobile device. Systems of the invention enable the creation, management, storage, presentation, revision, and delivery of content with full and real-time interaction to device users. In certain embodiments, content creation is easily done using an XML-based format, and the system supports most mobile device platforms (i.e. Java, Symbian, Windows Mobile, Blackberry, Android, iPhone and others) and is readily adaptable to new platforms as these may arise.

Systems of the invention comprise three parts: a web interface for content creation and management, as well as end user data analysis; a gateway server where the bulk of the code resides, and where content preparation and data storage are performed; and one or more client applications that run on end-user devices to deliver and allow interaction with content.

In certain embodiments, content is created as XML files using the web interface accessed via a standard browser. The content is uploaded as sections to the gateway server, and output as client sections in a packet format to be delivered to users through the client applications. The web interface can be a stand-alone application, for example, mounted on a Java servlet container such as Tomcat. Communication between the web interface and the gateway server can be done via dedicated TCP/IP socket connections.

In certain embodiments, the gateway server is a system built using Java 2 Standard Edition, with some Java 2 Enterprise Edition features also used. The server system is divided into several separate applications. Each application can be run on its own, or they can all be run together using a Virtual Machine. The gateway server communicates both internally and externally with TCP/IP socket connections. Data is sent internally as packets, using a simple packet format. The communication on the production side (i.e. using the web interface) is done using XML (in the form of XML packets). The server system also uses the packet format when communicating with the end user client application.

The client applications that are run on mobile devices can be Java ME MIDP applications. They can also be ported to non-Java platforms such as the iPhone and non-MIDP platforms such as Android. The client applications communicate with the gateway server via either a TCP/IP socket connection, if available, or over HTTP. The client applications can be built in many variations, depending on project-specific platforms and technologies. In certain embodiments, the client application can be built to operate in Java, Symbian, Windows Mobile, Blackberry, Android, iPhone and others. If new handset platforms are created in the future, systems of the invention makes it relatively straightforward to port the client application to these as well. Additionally, one of the strengths of the system is the ease with which the system can be tailored according to the needs and demands of individual projects.

The client application is tailored to the particular device it sits on. In this regard, the client application functions like an "outer app". The client application functionalizes content delivered by the system in a client form to the device.

Content creation, performed using the web interface, takes place on the production server. Content delivery is accomplished via download or streaming sections from the production server, through the gateway server, and to the client application. Background images, text, color, and layouts can all be fully-controlled by the production server as well in real-time. Fine tuning of the layout is handled by the client device itself.

Systems of the invention were originally developed for Java ME. In certain embodiments, the system takes full advantage of the Java ME standards. All the normal features of mobile telephony, including SMS, MMS, and dialing can be used, as well as the capturing of images, audio and video that can be uploaded to the gateway server. With the introduction of the iPhone and other touchscreen devices, the system has been extended to support additional features available in these devices.

Interactivity is a key feature of systems of the invention, and many types of input can be facilitated by the client application. Users of the system can supply data items, which can be stored in a core database on the gateway server. User data items can include text, such as a user's name or a chat message. In addition to standard text and similar inputs, users can also take photos, capture video, record audio and upload the resulting multimedia files as input sent to and stored on the server.

User-supplied data items can be used as input to generate content dynamically, such that this input can be incorporated into content sections that are, in-turn, delivered to one or more users. In certain embodiments, data items are individual to an end user (i.e., a user's password, or private messages). In certain embodiments, a user's input becomes a group data item and is incorporated into content which is delivered to multiple users, for example photo sharing or group chats. User input data items can be dynamically incorporated into content as it is distributed, thereby creating end-user apps which can be influence in real-time by real-world events.

The gateway server allows content to be pushed directly to end-users, allowing content to be updated via the web interface and sent out automatically. Updates can also occur responsive to input requests.

In certain embodiments, there is a shared abstraction of Content Object types between client and server.

In order to make the inner app executable, navigable and displayable on disparate client platforms, the various widgets and commands that constitute content app screen elements, navigation etc. exist as Java SE classes on the server, and they also exist as the equivalent Java ME or ported platform specific executables (e.g., Objective-C classes for iPhone) on the client side. The content app may thus be authored on the server, yet streamed and re-created as equivalent classes on the client, where they are interacted with by the outer app.

2. Content Preparation

Some of the steps involved in distributing the server-side content app to the client are briefly described below.

A content app is authored by a producer on a production server. In certain embodiments, the content app is authored by the content producer as XML. This XML describes the desired screen layout, content and navigation that should constitute the "content" or inner app that runs under the outer client executable.

Note that the content app constituent elements (e.g., content objects) have been constructed so as to enable the key functionality associated with using a handheld app, i.e. displaying and selecting menu items, assigning buttons to commands whose targets enable screen navigation, playing sounds, user input text boxes, etc.

Content in the system comprises content items, content objects, and resources. End user interaction is enabled using commands, invocable objects, targets, input objects and answers.

Content objects are constructions according to certain embodiments of the invention that contain detailed descriptions of content items. Content objects can describe visual or non-visual elements, for example for either display or interactive functionality. Content objects are stored in XML in client application sections. Some displayable content objects, such as forms and menus, often contain other content objects. Content objects are discussed in considerable detail in Section 5, Content Objects, infra.

The invention supplies applications capable of handing more types of high-level objects than standard Mobile Information Device Profile (MIDP) mobile applications. Standard MIDP applications consist of screens displayed on a mobile device one at a time. Navigation between screens, and user interaction, is generally performed using commands mapped directly onto buttons, or placed in menus that are mapped onto buttons. MIDP screens use high-level displayable objects (list, text box, form or alert) that can be displayed as pages within an application.

Systems and methods of the invention provide applications in which screens are represented by displayable objects. Navigation is performed using invocable commands associated with the displayable objects. This closely resembles the MIDP standard described above, however applications of the invention can handle more types of high-level object than standard MIDP applications, and applications of the invention can be adapted for non-MIDP platforms. On Touch-screen devices, applications of the invention include commands that are mapped directly onto buttons that can be pressed on the screen.

Applications are created as XML files called sections, that can be edited via the Web interface. The section XML files are sent as packets, using the a packet format. The downloaded section instructs the mobile device what should be displayed on its screen, and how end user interaction with the application will be enabled.

When the mobile application is downloaded to a mobile device, it is initially empty—containing only a logo and a start screen.

Content is then prepared on the production server and downloaded to the application as sections each time the application is started.

If and when a section is updated on the server, the corresponding section being viewed by end users on the client applications is updated synchronously, in real time. Synchronization is achieved through the server pushing updated content to the client apps.

Many objects used in content preparation are high-level objects that exist only on the server. These are compiled into low-level objects before being pushed out to client applications. The use of high-level objects allows for a much richer interface for producers using the web interface to create or manage content.

The web interface allows the producer to access of all the features and functions of the system. The invention provides applications that can also be made to work offline (i.e. without the need to be connected to a server). Offline applications contain pre-loaded content which may or may not be updated from the gateway server when a connection can be established depending on the configuration. Content downloaded from the server may or may not be cached for local use later, again depending on the configuration.

In order to deliver the often sizable and complex content to the client in a timely, responsive and reliable manner, the system uses a proprietary multi-phased preparation process that has been designed to: send only the content immediately relevant to the client's navigated target; send only content that has changed since the client last loaded the content (or allow a particular content section to be explicitly manually pushed if desired); ensure that previously prepared content is not needlessly prepared again; enable real-time push of server authored content and dynamic screen navigation to the client; and decouple client connectivity and content preparation as much as possible in order to create interactivity reliability and flexibility in server hardware/software configuration.

The final outputs of the multi-phase content preparation process are content objects encoded as proprietary binary packets that are pushed in real-time to the client. The content preparation process happens as a result of client interaction, as a result of content changing on the server, or as a result of scheduled or ad-hoc events on the server.

FIGS. 1-4 illustrate the sequence of events for various scenarios for content preparation. These scenarios may occur as a result of client initiated activity (such as logging on, navigating to a new screen, selecting a menu item etc.), or because content may have changed on the server (e.g. updated RSS feed, producer has changed content layout, attributes, images, navigational command target (screen flow) etc.), or because a scheduled or ad hoc event has occurred.

In certain embodiments, the invention provides a production application. In some embodiments, the production application is provided in a dedicated production server. In some embodiments, the production application runs in a production server in a virtual machine. In some embodiments, the production application runs on a computer on which other applications of the invention run. The production application handles resources and preparation that can be considered universal for a content app (i.e. the same for all users of the app) such as images and RSS feeds. This is known as phase 1 content preparation. Note also that it does not deal with user-generated data (such as individual user's inputs, or chats common to and generated by multiple users), nor with client connectivity.

In certain embodiments, the invention provides one or more gateway applications. In some embodiments, the gateway application or applications is or are provided in one or more dedicated gateway servers. In some embodiments, the production application runs in a gateway server in a virtual machine. In some embodiments, the gateway application runs on a computer on which other applications of the invention run. As used throughout, for convenience, "gateway application" can refer to any embodiment, including those with more than one gateway application. The gateway application handles client connectivity, and resources and preparation that are related to "grouped" end-user generated data, such as the above mentioned user inputs or chats (phase 2 content preparation), and also individual end-user specific data such as username and age (phase 3 content preparation).

In certain embodiments, content is organized into "sections" (see Sections section, infra). These represent logical groupings of widgets that should be treated as one unit by the client. Sections enable timely delivery of content to the client, as content apps can be segregated so that frequently accessed screens or data can be isolated into their own sections, leaving the rest of the app unaffected.

When a client logs on, the section requested is the so called "lobby" section, the initial section displayed in the content app. The lobby is identified using the domain of the application as identified in the client configuration.

FIG. 1 illustrates multi-phase content preparation according to a logical sequence as a result of client navigation. In this diagram, the lobby has never been selected by anyone, so phase 1 is triggered. Similarly, when navigating to a section not previously loaded by any other client, the target identified by the navigation command will be passed from the gateway to phase 1 content preparation on the production server.

When users login or navigate to a new section, they become registered on the server as listeners to that section. This is the main mechanism whereby changed or new content later becomes pushed to the particular client. Only registered listeners will receive updates, thus minimizing bandwidth consumed and optimizing client responsiveness.

Figure 2:
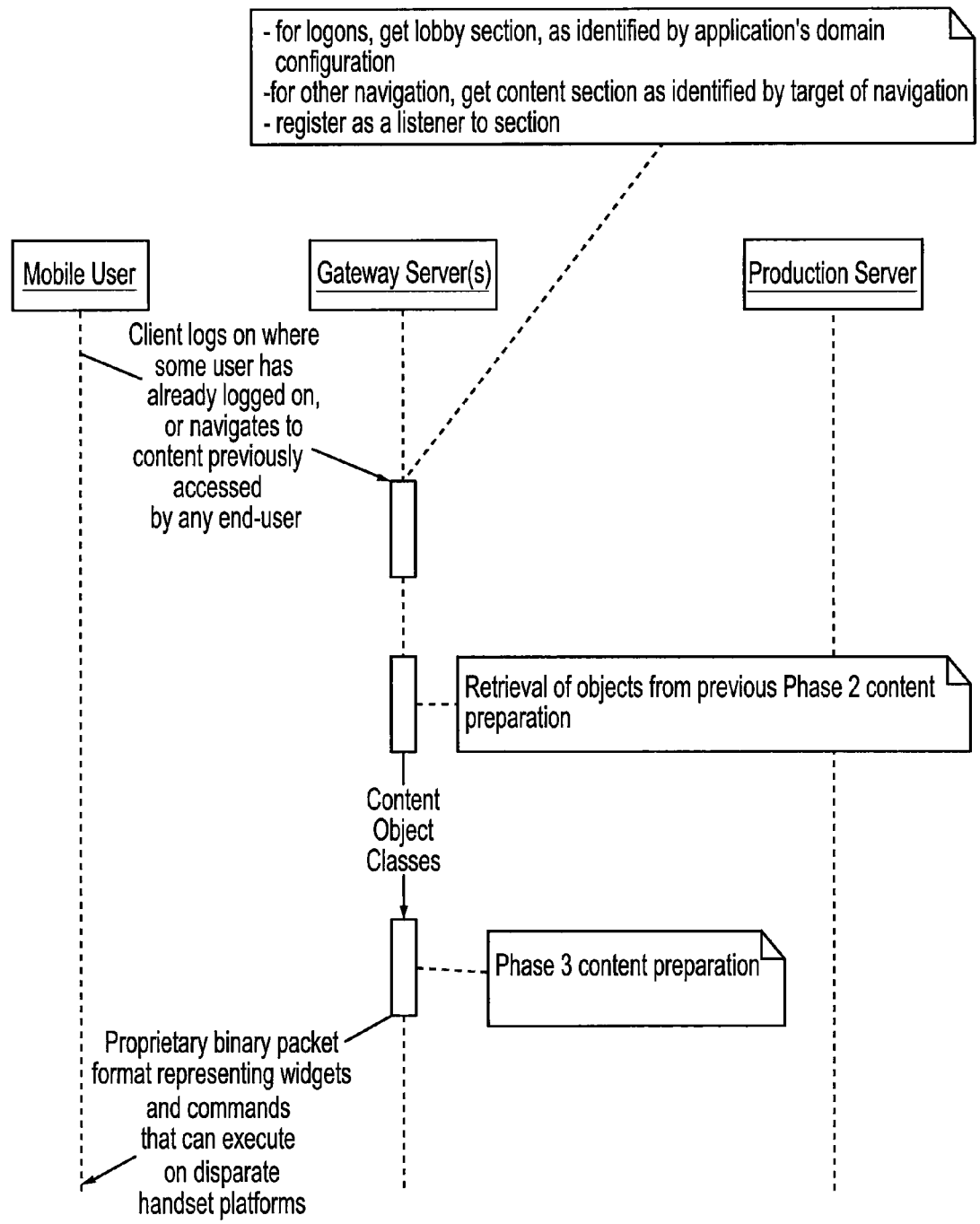
FIG. 2 illustrates multi-phase content preparation according to a logical sequence as a result of client navigation where content already exists.

FIG. 2 illustrates multi-phase content preparation according to a logical sequence as a result of client navigation where content already exists. Here we see a client logging on to an application where another client has already logged on, or a client accessing a section that another client has already accessed. In this case, objects already exist cached in memory which may be immediately furthered to stage 3. This illustrates one of the main optimizations offered by the multi-stage content preparation process.

Figure 3:
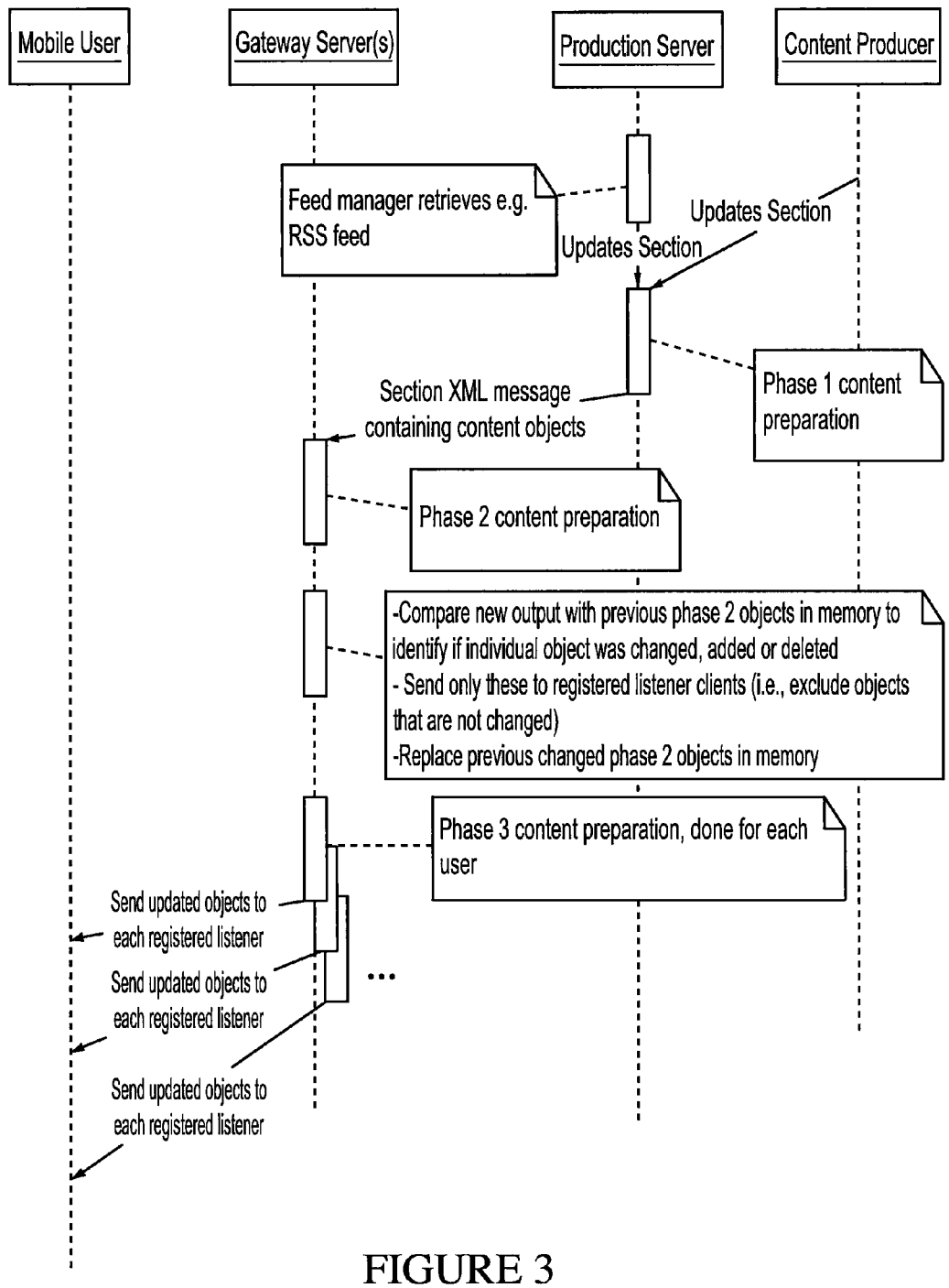
FIG. 3 illustrates multi-phase content preparation according to a logical sequence as a result of content changing on the production server.

FIG. 3 illustrates multi-phase content preparation according to a logical sequence as a result of content changing on the production server. Here we see the sequence of events that occurs as a result of content changing on the server. This could be e.g. because the producer has authored changes in the content layout, attributes, images or navigational screen flow in the content app, or because the Feed Manager has automatically retrieved content via an RSS feed.

In certain embodiments, the invention supplies a construct known as an event (see section on events, infra).

Figure 4:
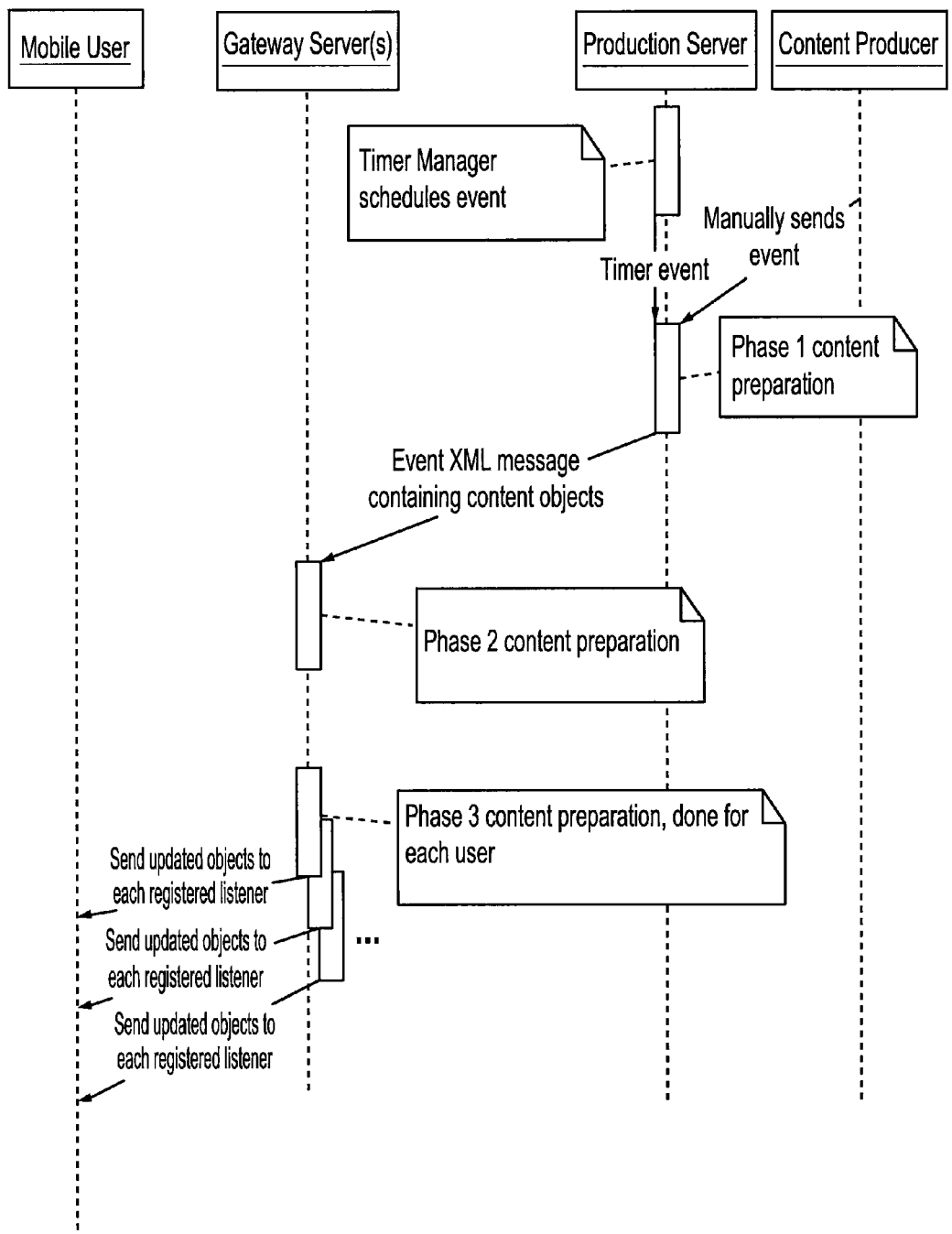
FIG. 4 illustrates multi-phase content preparation according to a logical sequence as a result of events such as a scheduled event or a manually sent event.

FIG. 4 illustrates multi-phase content preparation according to a logical sequence as a result of events such as a scheduled event or a manually sent event. Here we see the sequence that occurs as a result of an event being triggered on the server. Events are special messages (containing a target and content objects) that trigger special actions on the client side (e.g. navigate to new screen, vibrate, play sound etc.).

Events can be sent in an ad hoc fashion by the producer, or they can be sent by the Timecode Manager as a result of scheduled relative timecodes (authored by the content producer) in relation to an external start signal (e.g. the manually signaled start of a quiz).

Figure 5:
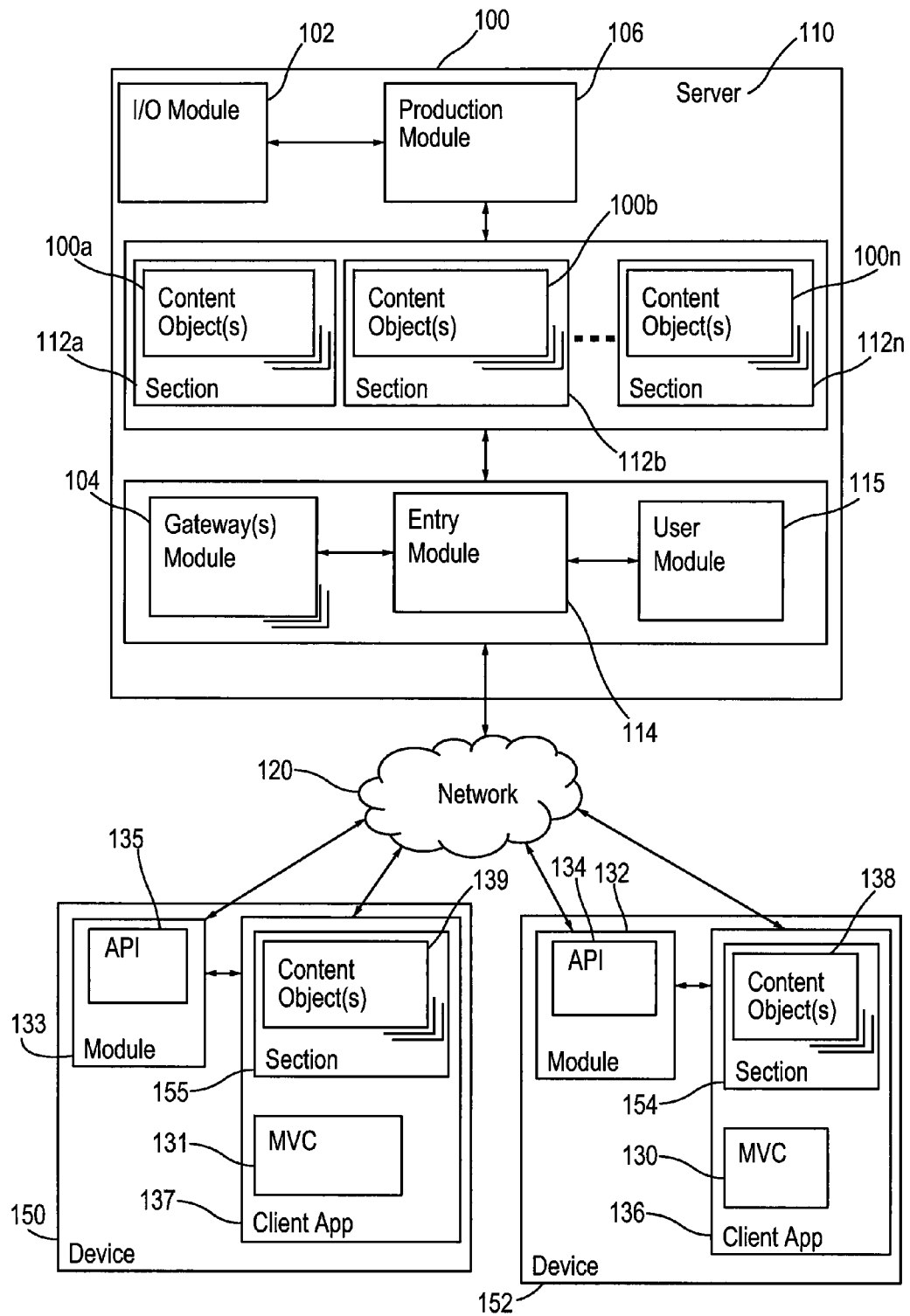
FIG. 5 provides a block diagram of systems according to certain embodiments of the invention.

FIG. 5 provides a block diagram of systems according to certain embodiments of the invention. In certain embodiments, the invention includes a production module 106 accessed by a producer through an input/output module 102. Sections 112a-112n are authored via the production module and sent to one or more gateway modules 104, which compiles them. Each section may contain one or more content object 100. Optional entry module 114 and optional user module 115 coordinate communication among client app 137 on device 150, client app 136 on device 152, and the one or more gateway 104 over network 120. In some embodiments, each module is an application. In some embodiments, each module is provided by a dedicated server.

Client app 136 receives a section 154 containing one or more compiled objects 138. Module 132 generally includes a platform such as Java or iOS, which supplies an application programming interface (API) 134. Client app 136 includes a model view controller (MVC) 130 that controls communication with the server; re-creates content object 138 as it is streamed from the server 110; controls interaction between one or more content object 138 and any other content object(s); and interfaces the one or more content object(s) with the native hardware API 134.

Client app 137 receives a section 155 containing at least one compiled object 139. Module 133 generally includes a platform such as Java or iOS, which supplies an application programming interface (API) 135. Client app 137 includes a model view controller (MVC) 131 that controls communication with the server; re-creates the at least one content object 139 as it is streamed from the server 110; controls interaction between the at least one content object 139 and any other content object(s); and interfaces the at least one content object with the native hardware API 135.

System 100 includes a number of modules. In certain embodiments, these are included in server 110. In alternative embodiments, each module is provided by a dedicated server, or some modules, for example gateway module 104, entry module 114, and user module 115, are provided as applications on server 110, while production module 106 is provided on a separate, dedicated server. In some embodiments, input/output module 102 is a web interface.

In some embodiments, server 110 is a computer-based machine containing a set of instructions for causing the machine to perform any one or more of the methodologies discussed herein. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. For example, in certain embodiments, production module 106 is a client machine and gateway module 104 is provided by a server machine 110 in communication with the client.

In various embodiments, machines of the invention can be, as necessary to perform the methodologies described herein, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while server 110 is illustrated as a single machine, the term "machine" shall also be taken to include any collection of machines that individually or jointly execute a set (or multiple sets) of instructions to perform any one or more of the methodologies discussed herein.

As one skilled in the art would recognize as necessary or best-suited for performance of the methods of the invention, devices 150 and 152 are also computer machines. In a preferred embodiment, they are each handheld computing devices such as smartphones, iPhones, tablet computer, laptops, PDAs, computers, or e-readers.

As one skilled in the art would recognize as necessary or best-suited for performance of the methods of the invention, computer systems or machines of the invention include one or more processors (e.g., a central processing unit (CPU) a graphics processing unit (GPU) or both), a main memory and a static memory, which communicate with each other via a bus. Computer systems or machines according to the invention may further include a video display unit (e.g., a liquid crystal display (LCD) or a cathode ray tube (CRT)). Computer systems or machines according to the invention can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

A disk drive unit according to the invention can include a machine-readable medium on which is stored one or more sets of instructions (e.g., software 424) embodying any one or more of the methodologies or functions described herein. The software may also reside, completely or at least partially, within the main memory and/or within the processor during execution thereof by the computer system, the main memory and the processor also constituting machine-readable media.

The software may further be transmitted or received over a network 120 via the network interface device.

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories (e.g., subscriber identity module (SIM) card, secure digital card (SD card), or micro SD card), optical and magnetic media, and any other tangible storage media.

3. Client-Side Outer and Inner App Interaction

Systems and methods of the invention provide applications which can be installed on devices, such as mobile devices, such that the applications cause content to be executed. In one illustrative analogy, the applications are similar to an operating system, within the operating system of the client mobile device, within which the content objects are executed. In another illustrative analogy, the applications are like an "outer app" which an end-user installs on a mobile device. The outer app then executes an "inner app" when it is streamed from the gateway application. In certain embodiments, the applications are referred to as mobile applications, client apps, outer client-side apps, or outer apps. In certain embodiments, the content upon which they operate are referred to as inner apps, inner content apps, content apps, or content objects.

The outer client-side app will create a usable inner content app from the content objects that were streamed from the server over the socket or HTTP port. The Model View Controller (MVC) algorithm that is encoded in the outer client app takes care of: communication with the server; content object re-creation, as streamed from the server; controlling interaction between content objects; and interfacing the content objects with the native hardware API. The client-side outer app is discussed in greater detail in a section on The Mobile Application, infra.

Systems and methods of the invention supply content apps that can be altered without requiring client recompilation, distribution, or installation.

Content applications created using the architecture described in this document possess the advantage of not requiring re-compilation, re-distribution and re-installation of a client-side program every time aspects of the content app are altered. Content producers are free to change characteristics that are inherent within the framework of the abilities of the Content Objects and have these be distributed to the client in real-time without a client-side (outer) app re-install, or without requiring explicit client input.

This can include completely altering existing screens, adding and subtracting screens, altering flow between screen, some aspects of screen layout, changing data content and more.

In certain embodiments, systems and methods of the invention provide a unique command/target architecture. The command/target architecture enables hardware agnostic navigation and also permits content apps to be built without requiring recompilation A key part of authoring content once on the server and having that content usable on disparate client platforms, is the system's proprietary use of commands and their targets. The command/target architecture also allows content apps to be created without requiring client-side recompilation.

When the content app is authored, commands such as OK, Back, Select, etc. may be specified on any given screen. The commands used closely match the set of commands as specified by MIDP. The innovative use in this system for commands however, is the ability to associate the command to a target for a given displayable object.

For example, a Text Input displayable object that accepts user chat input might be authored to associate the standard OK command with a system proprietary target that performs multiple actions, e.g. sends the chat input to the server, and then invokes a Back command to return to the previous screen.

A client runtime description for this example would be:

1. The user pushes the OK button and a hardware specific API notifies the system's registered view listener (under the MVC model) of this event.

2. The system's outer app checks the current displayable object (the Text Input) for a matching command (OK in this case).

3. The outer app invokes the specified target associated with the found command (in this case another authored element called a CompositeTarget, which performs the server send and then Back navigation).

In the absence of this command/target architecture, software listeners would need to be encoded in the outer client app for MIDP hardware commands (or their equivalents on non-MIDP platforms) for each distinct content app, thus necessitating multiple apps to be maintained, versioned, compiled, distributed and installed. Furthermore, if a given content app altered, for example, the target for a given command, this would also require re-compilation, re-distribution etc. in the absence of this command/target architecture.

Systems and methods of the invention provide a useful functionality in, among, and in the relationships among commands, targets, invocable objects, and macros. Targets and invocable objects are believed to be a unique feature of systems and methods of the invention, with no equivalent in MIDP. Targets and invocable objects empower the interactive functionality of the invention.

In certain embodiments, commands are similar to MIDP command objects, but offer additional functionality. In addition to the visual presentation of the command, type and priority can also be specified.

Certain other platforms, such as Android and iPhone, don't include commands as a native feature, so systems and methods of the invention provide commands to run on platforms such as these.

When activated, a command invokes a target, which is either an invocable content object, or a macro describing some special action. If the target is the id of an invocable object, the object is invoked and the appropriate action is taken. For example, invoking an object can result in displaying a displayable object on screen, playing an audio or video clip, uploading a photo, or sending an SMS.

User interaction in client applications is enabled by invocable commands attached to displayable objects displayed on the mobile device screen. Commands can also be attached to non-displayable objects such as menu items and item objects. Depending on the mobile device, user interactions are performed in different way. Some devices use touchscreens as input devices, other devices use buttons. End user interaction can be tailored to different mobile devices.

Command objects don't themselves contain information about their targets. This is specified in the displayable (object) associated with the command. Commands can be included in menus, command bars, or mapped directly onto buttons.

When defining commands in a section, commands are allocated priorities, allowing the client application to gauge their relative importance. Commands are sometimes handled differently on different mobile devices, so the look and feel of a client application can vary somewhat, and end user interaction can be tailored for each device.

Active commands are associated with displayable objects currently on-screen. Any number of commands can be active at the same time.

A representative list of invocable objects is given in Table 1.

TABLE 1

| Invocable Objects | |
|---|---|
| Name | Description |
| Displayable Objects | a content object that can be displayed on a mobile device as either a screen or a canvas, and can generate a command for user input |
| Input Objects | an object generated via end user input, such as text, image, audio clip, etc. |

TABLE 1-continued

Invocable Objects

| Name | Description |
| --- | --- |
| Quiz/Survey | special content objects containing questions for quiz-type games, statistics gathering and/or market research |
| Composite Target | allows multiple actions to be performed by a single command |
| Platform Request | invokes platform requests - i.e. opening a web browser |

If the target is a macro, the macro is executed. Executing a macro can, for example, result in flashing a backlight, vibrating, or returning to the previous displayable object (logical back). Macros are an abstraction layer to native mobile functions. The use of macros allows single sections and contexts to be used across a wide range of mobile devices, though the actual handling of macro commands is performed separately on each device.

Macros are used for hardware-related commands. Hardware related commands are useful for controlling screens and navigation, GPS, connectivity, audio, backlights, vibration and memory; as well as for some logical functions. One example of a logical function is "run target", a macro that executes a target in a separate thread on the client application. This is useful for executing functions that might lock up the device or similar. Macros are identified by a prefix of two underscores (e.g., "_back" is the name of the macro performing a logical back (return) to the previous screen).

Macros run on the server as an abstract construct describing functionality on the client application. Macros can run on all client platforms.

4. The Mobile Application

The mobile application (client application, user application, outer app) is the end-user application that is run on the mobile devices. Depending on what technologies the mobile device supports, the mobile applications are different. Originally, systems and methods of the invention were developed to support Java ME devices, which has influenced the content heavily. The invention also provides an application for iPhone, as well as an Android application under development. Regardless of implementation, the mobile applications all offer the same basic functionality. As an illustrative simile, the mobile application works like a browser for content. Content is sent from the server in a compiled state. The compiled content is sent as compiled sections, containing low-level objects and commands.

The client application is then responsible for displaying the displayable objects, content items, and content, as well as handling user interaction. Any included resources are also requested by the client application when they need to be displayed, and downloaded from the server at that point. Depending on manufacturer-specific standards of the device, the application needs to be tailored for specific devices or device families. Three exemplary categories of applications are Java ME, iPhone or Android applications.

Java ME applications also can be tailored to specific vendors, or to suit the technologies offered by the device. For instance, even though Blackberry devices support MIDP, they use their own MIDlet standards. Blackberries do not use the JAR files that the standard dictates, but instead a similar file type called COD files which are unique for blackberry devices.

Most other devices can use the generic MIDP 2.0 application.

When a mobile device first connects to a server of the invention, it is identified using its User Agent HTTP header, which is sent along with HTTP packets as part of the header. Most devices give informative User Agents stating exactly which device it is. If it is possible to identify the device, a ticket is generated for the user, and using the ticket the user is sent an SMS containing a download link for the appropriate version of the user application. The user is also registered on the user application. Once the application is installed it can be started. Once started, it downloads the lobby section for the specific project the user registered for, and displays the content on the device, starting with the main object.

If the application consists of several sections, each section is downloaded when the user opens that section. This means that sections that are not accessed will not be downloaded by the client needlessly. When the user connects to the server, statistics about the user's activities can be stored as sessions. Basic functionality for any mobile application includes: starting, pausing and stopping the application; handling the connection to the gateway server; handling content, packets and requests sent from the server; displaying content; handling content updates; and handling user interaction with the application.

Depending on the capabilities of the device, optional functionality includes: audio playback and control; video playback and control; saving data on the device; backlight control; caching resources in device memory; vibration control; GPS control; image, audio, and video capturing and uploading.

Systems and methods of the invention provide mobile applications for a variety of mobile platforms. In certain exemplary embodiments, the invention provides mobile applications for Java ME, iPhone and iOS, iPad, Android, Windows Mobile, Windows Phone, Symbian, and bada.

Java ME

Java ME is short for Java Platform, Micro Edition, and is a Java platform designed for mobile devices and embedded systems. Java ME was formerly known as Java 2 Platform, Micro Edition (J2ME). Basically, Java ME is a minimalistic programming interface for embedded devices, offering only the most basic functionality. This is due to the need of keeping the size at a minimum in order to make Java ME usable on as simple devices as possible. Java ME applications are built in frameworks, which contain the basic set of Java libraries and virtual-machine features needed to run a Java ME application. The Connected Limited Device Configuration (CLDC) is one such framework, that is targeted for devices with limited processing, memory and graphical capabilities. The Connected Device Configuration (CDC) is a richer framework than CLDC, containing almost all libraries of Java SE that are not GUI related. Java ME devices implement a so called profile, like the Mobile Information Device Profile (MIDP) which is used for mobile devices. The core API for MIDP are defined by the CLDC, and only offers resources for basic I/O operations, some basic GUI-related objects, a record management system that can be used for persistent storage and MIDlet support. GUI related objects specified in MIDP are for instance displayables such as List, Alert, TextBox, Form and Canvas, or Commands, which can interact with displayables and provide user navigation. In certain embodiments, Java ME is the base platform for systems of the invention. The advantages of Java ME is that it is widespread, and all devices that support it can run Java ME applications. This means that the same basic application can be run on all these devices.

Some smart phones do not support Java ME, but a very large percentage of the mobile phones in the world offer Java ME support.

In certain embodiments, the invention supplies applications capable of running on different types of devices, such as newer and older devices. Newer devices support MIDP 2.0, but as there are also older devices, MIDP 1.0 applications are also needed to provide support for a greater number of devices. In certain embodiments, simpler applications are provided for devices with differing multimedia support. In certain embodiments, systems of the invention use the full functionality provided by MIDP. Java ME applications by themselves, because Java ME is so minimalistic, use only certain existing libraries. Accordingly, all functionality is implemented within the applications.

iPhone/iOS

The iPhone is a line of smartphones made by Apple (Cupertino, Calif.). Apple's iPhones are under strict control. Most devices are sold with a SIM lock that locks the device to one particular carrier. Devices must also be activated either in the store or online, via iTunes. Furthermore, applications for iPhone have to be signed by Apple or they can not be run on a standard iPhone (without "jail-braking", e.g. changing the firmware). Any such changes to the firmware, or even removing the device's battery voids the warranty.

However, iPhones offer a very rich platform for mobile applications. The user interface is built around touchscreen technology, providing a very nice user experience. The devices has only one button and the touchscreen as means of input. Even the keyboard is virtual and used via the touch screen. The touch screen also features multi-touch technology (special user input can be made using two fingers and special gestures such as pinching motions) and a 3-axis accelerometer that senses the orientation of the phone and changes the screen accordingly, allowing the user to easily switch between portrait and landscape mode. Further, iPhones also offer good multimedia support and internet connectivity, as well as a camera. Applications must be signed to work on iPhones. The iPhone uses the iPhone OS, a mobile operating system based on Mac OS X. The iPhone OS uses the same UNIX-based kernel as OS X.

The programming language of iPhones is mainly Objective C, which is an object oriented language based on the c programming language. iPhone applications follow a strict Model-View-Controller principle. The application interface of the system consists of three layers; core services, media layers and Cocoa touch. Core services supplies a vast range of basic functionality, such as networking and databases. Media layers supply 2D and 3D-graphics, video and audio. Cocoa Touch is the advanced user interface, and is a version of Cocoa (which is an API for OS X) made for touchscreen devices. Together the layers provide a rich and complete user interface. Also, iPhone does not support Java ME. Accordingly, the invention provides special client application for iPhone to run on this platform. The iPhone client application works in the same way as the Java ME application, but is completely rebuilt in objective c. The basic functionality is the same: downloading, reading, and displaying content stored on the gateway server. However, the user interaction is customized for iPhone, to accommodate the touch screen as an input device as well as to conform to Apples standards and regulations.

iPad

The iPad provides the same platform as iPhone, with a few extensions mainly in regards to the much bigger display. Systems and methods of the invention provide the iPhone application to be used on iPad. Development is, however, being done to allow features specific to iPad to be used by configuring properties in themes and sections. The iPad features are made available by using conditional coding. The iPhone and iPad applications shared the same code base.

Android

Android is an open, Linux-based operating system and application interface for mobile devices from Google (Mountain View, Calif.) and the Open Handset Alliance. Android is open source, and is free to use for all manufacturers of mobile devices. Similar to iPhone, Android supports a much richer platform for mobile applications than Java ME. However, unlike iPhone it is not restricted, but instead open source and available for a range of devices. Like for Java ME applications, this will probably mean that different versions of the application has to be made depending on what capabilities the device has. Among other things, Android also supports touch screen interfaces (with and without multi-touch). User interfaces can also be integrated into the native interface of Android devices. Android applications can be written in Java. However, Android does not support Java ME, so the original Java ME applications of the invention did not work on Android devices. In fact, Android uses its own virtual machine called Dalvik, which is tailored for the resources of mobile devices. Among many other differences from the Java VM, Dalvik executes code compiled in its own format called dex-files. While Android applications are written in Java, using the same syntax as Java, it is also somewhat different from regular Java.

Windows Mobile/Windows Phone

Windows Mobile is a mobile operating system developed by Microsoft (Redmond, Wash.). The latest versions of the platform have been rebranded as Windows Phone. The operating system is intended for use on mobile devices, smart phones, pocket PCs, and personal digital assistants (PDAs). The system is based on Windows CE, which is a minimalistic operating system intended for use on embedded systems and other limited hardware platforms. Many mobile device manufacturers offer models using Windows Mobile or Windows Phone.

Several vendors, such as HTC (Bellevue, Wash.), include Java ME support on their Windows Mobile models. There are also both commercial and free Java VM implementations available, which allow Java ME applications to be run on Windows Mobile devices. Because of this, the invention provides a Java ME client that can be run on most Windows Mobile devices, though a third party JVM may be required.

BlackBerry

BlackBerry is a line of smartphones from Research In Motion (RIM) (Waterloo, Ontario, Canada). Due to offering e-mail and Internet browsing capabilities early on, BlackBerry rose to become a popular alternative as a business-oriented smartphone. Today, BlackBerry is the second largest manufacturer of smartphones world wide, and largest in North America. BlackBerry devices run their own operating system, BlackBerry OS. While BlackBerry OS does support Java ME and MIDP 2.0, there are some unique concepts that make it impossible to directly run Java ME applications on BlackBerry devices.

Symbian

Symbian OS is the most popular mobile operating system in the world. Symbian was originally developed as a joint venture by Ericsson, Nokia, Motorola and Psion, but has since been bought up by Nokia (White Plains, N.Y.). After the acquisition, a non-profit organization called the Symbian Foundation (London, UK) was established, and Symbian OS was released as an open source operating system. Since Symbian devices today make up as much as half of the smartphone and mobile market, it is perhaps the most important customer base in the mobile phone market. Symbian is made in C++, but provides Java ME support as part of the OS. Since Symbian phones support Java ME, the Java ME client application of the invention covers the Symbian user base, especially as MIDP 1.0 devices are taken into consideration—as discussed above—as there are many older devices still in use. In certain embodiments, MIDP 2.0 or above is preferred.

Bada

One platform for mobile devices is bada, developed by Samsung (Samsung Town, Seoul, South Korea), and is intended as a mobile platform for smartphones. It is made in C++. One can configure bada to use one of two separate kernels, which is why it is called a platform rather than an operating system. There is one Linux kernel available, but also a real-time operating system (RTOS) kernel which leaves a smaller memory footprint. The Linux kernel is intended for high-end devices, while the RTOS kernel is made for more limited devices. Samsung claims that bada will rapidly replace its proprietary feature phone platform, converting feature phones to smartphones. Applications for bada are written in C++, using the bada SDK. In bada, there is not yet Java ME support. One skilled in the art would recognize how to develop a client application for bada.

Mobile Application Handling

Systems of the invention handle content and compile it to a state that can be displayed on mobile devices. The invention provides the ability to handle large numbers of end-users, while allowing users with various kinds of devices to use applications of the invention. The mobile application operates on a mobile device and functionalizes the content app. The challenge, however, is to reach as wide an audience as possible. There are many different manufacturers of mobile devices. Many of the manufacturers use different operating systems and different standards. Even devices from a single manufacturer may very well differ a lot. The fractured standards of the mobile phone market makes developing applications that can run on several or all platforms very difficult. However, one of the interesting features of the invention is that since as little logic as possible is done on the mobile application, and instead on the server, the application can be made for many different platforms while offering the same functionality.

Device Identification

Because of differences between different device manufacturers and models, many versions of the mobile application are needed in order to be able to serve as many end-users as possible. The mobile application can be made for several platforms (Android, iPhone, Java ME). While the iPhone application only needs to run on one device family, Java ME and Android applications have to run on devices made by various manufacturers. Devices from different manufacturers can use different standards and provide a different set of features and capabilities. One of the best examples is Blackberry devices, which, even though providing Java ME support, use standards that require a completely separate version of the Java ME client.

The mobile applications are stored in the core database and can be added, removed and modified via the web-interface. Identification rules for knowing which application a device should get are kept in the global system configuration in a rule-chain-like structure. The devices are identified through the User-Agent HTTP header when the application is downloaded over HTTP by the device. Most devices give informative User-Agents stating exactly which device it is, for example the Nokia N95 User-Agent: "Mozilla/5.0 (SymbianOS/9.2; U; Series60/3.1 NokiaN95/10.0.018; Profile/MIDP-2.0 Configuration/CLDC-1.1) AppleWebKit/413 (KHTML, like Gecko) Safari/413". In some situations the User-Agent might be less informative or missing. That makes it very hard or impossible to automatically identify the device. These problems are not always caused by the device itself. The operator might use systems that affects the User-Agent. For example, this is the case with Vodafone UK, which uses a proxy system called Novarra. Novarra changes the User-Agent to its own, but not only that, it also modifies the data from the entrance server making it scrambled. The solution is to use direct socket connection over a direct internet connection instead of a WAP connection.

Application Customization

If a device can be correctly identified, and the correct version of the application is downloaded, further customization might be necessary in order to present the content. Customization might also be needed for presenting the content in a way that looks good on that specific device. For instance, many devices can run the generic version of the Java ME application. However, because so many different devices from various manufacturers support Java ME, the mobile application is tailored to individual devices. This customization can be achieved in a few different ways. Some devices, like Blackberry devices, require the client application to be compiled specifically for a certain platform.

Even though it is possible to compile an application without support for certain features (video, GPS, etc.), the application will still receive basically the same section as other devices (with some customization during phase 3 compilation and translation). This means that the section can still contain, for instance, video player objects and the option of viewing video will still be displayed on the device. If it is not supported by the device, an informative message will be shown if the user tries to view a video.

All applications are normally compiled specifically for each new project. This can be done so that custom icons, splash screens and other properties that are unique for all projects can be added for a new application. Plug-ins also needs to be compiled along with the rest of the application, and other project specific information needs to be added. Once an application has been compiled and it is ready for release, it is added to the database via the web-interface. After that the application is ready for download.

Apart from platforms, hardware and standards, devices also come with different screen sizes and multimedia capabilities. When the mobile application has been downloaded and installed, the mobile application gathers an array of properties for the environment it is running on. It identifies properties such as the exact platform and platform version, display size dimensions, multimedia support and other important information about the system. The information is gathered using methods native to the platform the mobile application is compiled for.

The server can then request these properties before sending content to the device, and customize the content in order to tailor it to the device. This customization is mostly for layout purposes. Depending on screen size, images might not fit in the screen of all devices. This can be solved in two ways. When adding image resources on the production server, it is possible to define alternative resources. A smaller version of the same image can be defined as an alternative resource which is displayed on devices with smaller screens. When image headers are compiled in the phase 1 compilation, images can also be scaled to fit the screen size of the device. Whether an alternative resource is used or not, or whether the image should be scaled or not is decided during the phase 3 compilation of images. This has to be done during phase 3 compilation, as the system properties for a device are unique for each device.

The final customization possibility is to use translations, which can be defined inside sections. Through the use of translations, an application can be modified depending on user input (settings, application set-ups, etc.) or the system properties sent by the device. Using the values given in the system properties, producers can define translation rules that modifies the section for different devices. Translations exist only on the server. Before the section is sent to the application, the translation rules are applied to the section (after phase 3 compilation), and the resulting translated section is sent to the application. As translations can be done just before sending the section to the application, translations are done individually for an end-user, meaning that translations can be used to further tailor the section for the device that runs the application. Translations can work differently on different content objects, as each content object has its own translation methods defining what can be translated and how it should be translated. It is possible for some objects to "translate" which image should be displayed, the targets of themes, and styles as well as the priority and commands.

Registration, Tickets and Downloading

In certain embodiments, the mobile application is often ordered by sending a registration SMS to a phone-number. It is also possible to register by other means, such as via a web page by entering the phone number manually and receiving a registration SMS directly. Regardless, the user is then identified by the phone number, and a new user is created on the user application on the server (if the user is not already registered). Users can also be registered from the web-interface. Producers can either enter individual phone numbers, or lists of phone numbers for a project. All the users that are registered this way are also registered on the user application. For each registration, a new ticket is created that uniquely identifies the registration and user. The ticket consists of a unique numerical id and a randomly generated pass phrase. The ticket is used to send a download URL for the correct application in a WAP PUSH SMS or as a plain text SMS. To download the mobile application the user must open the link in the phone's web-browser. Systems of the invention can be configured to either first show a download page or directly download the application when the link is opened. A download page can be used to give more instructions on how to install and start the application. The unique ticket is inserted into the mobile application when it is downloaded and is used when the mobile application connects to the server. When a user connects to the server, the ticket information stored within the application is used to identify the user.

Starting the Mobile Application

In certain illustrative examples, the mobile application works like a browser for content, but is unique for each project and user. There is no need for the end-user to authenticate or otherwise identify him or herself, as this is done automatically by the user application (using the ticket the user was issued when first connecting). In certain embodiments, when the mobile application is first started, a HTTP request is sent to the entrance server, using a URL included in the application. The entrance module sends back a response with one or more connection strings that the mobile application should use to establish the persistent connection to the system. The connection string is a valid MIDP connection URL that creates a HTTP connection or a TCP socket connection to a gateway server.

The first thing the mobile application does when a connection has been established is to send the ticket and the device's system properties to the server. By using the information in the ticket, the server knows exactly which user is connected, and what device is being used. The system properties give a lot of other useful information like screen size, supported multimedia formats, which platform is being used and so on. This allows content to be adapted for the specific device.

The Java ME Client Application

Java ME has been the most wide-spread technology for creating mobile applications for a long time. This is why it was used as the base platform for mobile applications according to certain embodiments of the invention. While the same basic Java ME application can be used on all Java ME devices, the application in reality needs to be somewhat adjusted for different devices depending on what MIDP profile the device supports and what other technologies and functions are offered by the device, such as GPS and multimedia functions. The biggest factor for Java ME mobile applications is whether the device supports MIDP 1.0 or MIDP 2.0. Systems and methods of the invention are intended mainly for use on MIDP 2.0 compliant devices. However, by disabling features that are not included in MIDP 1.0, the client application can be run on such devices as well. In some embodiments, the Java ME application must also be adjusted for specific manufacturers because the devices use manufacturer-specific standards that are not the same as MIDP standards.

The compiled mobile applications are stored in the core database, and can be added, removed or modified (for example, by changing icon and splash screen) from the web-interface. Java ME applications are called MIDlets. According to Java ME specifications, MIDlets should be packaged inside a JAR file with a manifest file indicating which classes implement which MIDlet. As well as the Java classes, the JAR file can contain other resources such as images or sound files. A JAD file contains the location of the .jar as well as the list of MIDlets in the suite and other attributes. Systems and methods of the invention use so called Over the Air (OTA) deployment of the application. OTA means that the JAD and JAR files are uploaded to a web server which is accessible over HTTP. Users download the JAD file and installs the MIDlets they require. In certain embodiments, the JAD and JAR files are stored in the core database, and download links are sent in SMSs from the entrance application.

In practicality, the mobile Java ME application is usually recompiled for every project. A project will typically require the application to be somewhat customized. The application might use a specific icon and splash screens, custom loading messages, a custom plug-in, handling some project-specific functionality etc. Any such customization requires that the application is recompiled to include the customizations. As systems of the invention were initially made for MIDP 2.0 devices, much of the Java ME client is based on this standard. In MIDP 2.0, objects can be "Displayables" which is the basis of the invention's displayable objects. Displayables can either be displayed on a screen, or painted on a canvas. A canvas represents an empty screen on the device. Alerts, forms, lists and text boxes can be directly displayed on screens. Lists resemble the menus and lists of the invention, containing a list of elements or images that can have actions and commands associated with them. Forms are containers for objects that might not be displayables on their own, such as images, text fields and items. Objects that are not directly supported as displayables can be painted on a canvas using paint methods. Originally, systems of the invention used the MIDP displayables to display all displayable objects, this is why the objects are based on the MIDP standard. However, since the MIDP user interfaces are somewhat limited, the invention provides its own user interface. This also allows for more customization possibilities. The user interface includes a custom canvas, and all low-level displayables can be painted on the custom canvas. The custom user interface allows more custom options for displayable objects.

In certain embodiments, the invention operates over a persistent TCP socket connection. However, it is not a requirement since not all devices support this (MIDP 1.0, for instance does not support socket connections). Instead, the connection can instead be done over HTTP, simulating a persistent two way connection. HTTP is also used as a fallback connection, which should always work if operators, carriers or firewalls block the traffic. The HTTP connection simulate a two-way connection by polling. Both sides send requests at regular intervals, checking if the other side has any new information to send. An identifier is sent with each request to make the requests part of a virtual persistent connection, and to make the connections a little safer as no one can act as a client without knowing the identifier. The connection can use both HTTP and HTTPS. In certain embodiments, the HTTP communication does not make use of any HTTP headers or functions, it simply writes binary data in the payload using POST requests.

In certain embodiments, the mobile application can also allow users to take pictures, record audio or capture video and upload it to the server. The picture, audio and video formats used will be the same format(s) the device supports. Images can be taken using the ImageInput content object. These objects are then handled in the application by capturing a picture and uploading it to the server. The VideoInput and AudioInput objects works the same way but captures and uploads video or audio. The MIDP 2 standard includes a function for flashing the backlight of a device. As backlight control in the invention is mostly used to get the user's attention (when an alert is displayed, or when a quiz question is popped up) this is sufficient in most cases. However, in some cases it might for instance be desirable to keep the backlight on while some displayable is displayed (for instance during video playback). The problem is that since this is not standardized, this option has to be dealt with for each device (or hopefully for each vendor). Vibration of the device is directly supported by MIDP. The exception is again MIDP 1.0 devices, as vibration control is only supported since MIDP 2.0. If a device has GPS capabilities, the mobile application can also use these to tell the server of the device's location. In certain embodiments, location is used for user statistics or surveys. The application can send SMSs or place phone calls using the standard Java ME interfaces for messaging and calling.

5. Content Objects and Subclasses

Systems and methods of the invention provide content objects, which can be included in the sections. Content objects are constructions according to certain embodiments of the invention that contain detailed descriptions of content items. Some objects describe visual elements to be displayed on mobile screens (displayable objects), while others describe non-visual elements or interactive functionality. Content objects comprise four different sub-classes: displayable objects; input objects; item objects; and resource objects.

In certain embodiments of the invention, content objects are stored in XML in client application sections. Accordingly, phase 1 preparation operates on a source section comprising at least one content object, and phase 2 preparation involves compiling the source section into a dynamic section comprising a corresponding content object.

Some displayable content objects, such as forms and menus, often contain other content objects. Objects added to forms may not necessarily be displayable on their own. Some objects may contain nested objects, creating a dependency between them. There can also be chains of nested objects. For example, a menu could contain further menus which in turn could contain further content objects. To keep track of such dependencies, they are represented by an object class of their own, and all content objects store any dependencies they have.

There are two levels of content object. High-level objects, for example, can generate menus with links to article text boxes from feeds. Low-level objects, for example, can be simple menus with defined styles, titles and items. High-level objects are for internal use only on the server, and must be converted via section compilation into lower-level objects before they can be sent to client applications.

Certain projects may require the creation of new and specific bespoke content objects.

New types of content object can also be added to the system as plug-ins if this is more appropriate.

All content objects contain the information listed in Table 2.

TABLE 2

Content object contents

| Name | Description |
| --- | --- |
| Id | Identifier (mandatory) |
| Name | Text identifier (optional) |
| Style | Style class (optional) |
| Access level | A set of rules defining which users are allowed or denied access (optional) |
| Properties | An array showing the object's properties |

Content objects in a client application are normally kept up-to-date with the gateway server in real-time. At the discretion of the project producer, the gateway server can automatically track when content objects are invoked by end users, and/or if displayable objects are in use, unless the client application is being used in off-line mode, in which case this information can be retrieved as soon as the app is back online.

Content objects are identified by a unique identifier and are linked together using these ids. All objects also have an access level, allowing producers to define which users are allowed or denied access to the object.

Some content objects are similar to objects in Java ME technology, while others are uniquely supplied by systems and methods of the invention. A list of content objects appears in Table 3.

TABLE 3 list of content objects

| | |
| --- | --- |
| ArticleListMenuItem | An item on an article list |
| ClientSideSurvey | A survey of questions delivered to end users |
| Command | An action taken on an invocable object |
| CompositeTarget | An aggregation of several targets in a single command |
| Countdown | A countdown of time remaining |
| Feed | A web feed |
| photoAlbum | An album containing images |
| Quiz | A series of questions requiring end user responses |
| sectionLink | A link to another section |
| SMS | An SMS |
| StyleClass | Defines screen layout and style properties |
| Ticker | A line of text that repeatedly scrolls across the screen |
| UrlRequest | A hyper-link to a specified URL |

Content objects comprise at least four different subclasses: displayable objects; input objects; item objects; and resource objects. A displayable object is an object that can be displayed on-screen. In certain embodiments, a displayable content object is similar to an MIDP displayable object. A list of displayable objects appears in Table 4.

TABLE 4

A list of displayable objects appears

| Object | Description |
| --- | --- |
| Alert | Displays an alert to the user. |
| AnswerList | Displays a list of answers. Answers can be any kind of user input, including images or text. Can also be used for chatting, or to display user-uploaded images (inc. photos). |
| ArticleList | Displays a list of article content items in a menu with text boxes containing the article text. |
| FeedItemList | Displays feed item titles in a menu with links to text boxes that contains the actual article text. |
| Menu | Displays a menu where the user can select a menu item. |
| PhotoViewer | Displays a photo album. |
| PollGraph | Displays a bar chart graph. |
| QuestionResult | Displays the result of a question. |
| QuizControl | Displays a number of questions stored as content items. |
| QuizQuestionResult | Displays the result of a quiz question. |
| QuizResultList | Displays a list of quiz question results. |
| ResourceCommentList | Displays end user comments on an image. |
| SectionList | Displays a list all of all the sections forming a project. Can be used as a menu in applications to simplify accessing other sections. |
| Table | Displays a table, where each cell contains text strings. |
| TextBox | Displays a simple text box, consisting of a title and a text. |
| VideoPlayer | Displays a video player. |

The most basic form of displayable object is a TextBox, which consists of a title and a text. Another useful displayable object is a Menu, which shows a list of alternatives to be chosen by an end user. Choosing a menu item invokes a target. Forms are containers that can contain more complex layouts of text, images, and/or other items. All input objects are also displayable objects. Each displayable object can be associated with any number of targeted commands. Commands are ready for invocation by an end user as soon as the object is displayed on-screen. Each displayable object can also have a defined style. Styles contain information about colors, graphics, and simple layouts for the title and content bars, as well as for the section itself.

Input objects are another class of content objects. Input objects are used for processing end user input. Simple input objects allow an end user to type in or select a value that gets sent on to the server. Each end user input item is referred to as an "answer" on the server (as in "an answer from the end user") and is stored in a core database with a time stamp. Input objects (i.e. text inputs) often employ a mobile device's own GUI, since input methods can vary between devices.

Input objects can also be placed in forms, allowing a multitude of different inputs to be associated (much like HTML forms). All input objects are also displayable objects. Table 5 gives a list of input objects.

TABLE 5

A list of input objects

| Object | Description |
| --- | --- |
| AudioInput | Allows an end user to record an audio clip |
| ChoiceInput | Allows an end user to choose one of several alternatives |
| DateInput | Allows an end user to input a date |
| FileInput | Allows an end user to input a file. |
| Form | A displayable object that can contain different items, such as inputs and/or images |
| ImageInput | Allows an end user to take a photo |
| MultiChoiceInput | Allows an end user to choose from a number of alternatives from a list. |
| NumericInput | Allows an end user to input an integer value. |
| TextInput | Allows an end user to input plain text. |
| VideoInput | Allows an end user to record a video clip. |

Inputs and answers are used to run quizzes, competitions, games, surveys, polls etc. A quiz and its inputs and answers can be configured so that an end user's answers can be scored, and the data thus gathered can be used to generate top scorers and other types of lists, analyzed as per a project's data analytics requirements (e.g. for market research), as well as output to third party software packages.

In certain embodiments, all the quiz/competition/game/survey/poll logic resides entirely on the gateway server where all the processing and data storage is performed; and apart from its I/O functions (i.e. sending inputs and answers onto the sever, and delivering display and content objects to the mobile device screen), the client application performs none of the processing and stores none of the associated data.

The client application displays the different types of inputs (with predefined start values) and sends the answers back to the server. Input objects can be used in both online and offline mode. Some input objects represent file uploads from end users (e.g. photos from the device camera if it has one, audio and/or video clips, etc.). Input objects can also be used to upload other forms of file, using the file input object.

Item objects are another class of content objects. Items objects can be placed into forms. Items are not displayable on their own, but need to be placed into forms to be displayed. Item objects are not the only objects that can be placed in forms—input objects can be used in forms as well. Table 6 supplies a list of item objects.

TABLE 6

A list of item objects

| Object | Description |
| --- | --- |
| Button | A button |
| HyperLink | A hyper-link |
| ImageItem | An image |
| SpinButton | A spin button |
| StringItem | A string |

Resource objects are a class of content objects. Resource objects describe resources. Resources are stored on the server's file system, and are downloaded to client applications separately from the content. Table 7 is a list of resource objects.

TABLE 7

A list of resource objects.

| Object | Description |
| --- | --- |
| Audio | Audio image resource |
| Image | Image resource |
| Video | Video clip resource |

Content objects exist in sections, the basic quanta of content according to certain embodiments. In certain embodiments, content creation begins the authoring of a source section via the web interface. The source section generally comprises at least one high-level content object.

The Content Objects output from the multi-phase content preparation process are of the subclass types Displayable Objects, Content Items and Commands, which have further final specific subclasses such as Menu, Table, DateInput, Button etc. These are built by the multi-phase content preparation process from higher-level constructs authored by the producer. These subclass types enable basic handheld functionality and have equivalent classes (e.g. for MIDP clients) or ported equivalents (e.g. Objective-C classes) that exist on the client side.

6. Events, Quizzes, Surveys, and Reports

Events

In certain embodiments, an event is used to give clients an opportunity to participate in a quiz or survey. For example, an event is invoked on the production server, ultimately causing a client application to display to a client one or more questions of a quiz or survey.

Events can be sent in an ad hoc fashion by the producer, or they can be sent by the Timecode Manager as a result of scheduled relative timecodes (authored by the content producer) in relation to an external start signal (e.g. the manually signaled start of a quiz).

In certain embodiments, systems of the invention deliver functionality unique to the invention by providing events. For example, there is no equivalent to events in the Mobile Information Device Profile (MIDP) specification published for Java. Events allow the server to control single or groups of client applications, creating what is effectively an intranet of mobile devices linked to and controlled by the server. Events, like commands, invoke objects, however commands are issued by the end user, and events are issued from the server.

Events contain a unique ID, a Target Section and a Target Object which together make up the address specifying which object in which section the event should invoke.

Events can also contain time attributes specifying how and when the event should be triggered. These time attributes include can Delay, Issue Date, and Issued Date. Events can also be synchronized to time code, and used by the server to drive different kinds of live and/or real-time applications. These attributes can be used to deliver a specified displayable object at a pre-defined time. Events can also contain an access level to control which users or user groups will be sent the target section and/or object by the server.

Events can contain nested content objects, which will be sent by the server (along with the event) to client applications. This allows events to be used for content delivery. This can be used to display a specified displayable object at a pre-defined time.

Events can be created either by producers using the Web interface, or be created automatically by the server at specified times. Events are only sent to end users who have the target section of the client application open on their devices. Events are used to drive live games and quizzes. Table 8 lists information contained by an event.

TABLE 8

Information contained by an event

| Name | Description |
| --- | --- |
| ID | A unique identifier |
| Target section | Id of the target section (optional) |
| Target object | Id of the target object (required) |
| Delay | Delay for invoking the target object once the event has been issued |
| Issue date | Date and time when the event should be issued |
| Issued date | Date and time when the event was issued |
| Access level | Access level of the event |
| Nested objects | Content objects contained in the event |
| At when | At when the event should be triggered |
| Target | The target to invoke on the target object |

As illustrated in FIG. 5, when an event is triggered, its specified target object is invoked.

The following XML supplies an example of an event according to certain embodiments of the invention.

```
<event target_section="1" target_object="TBox">
<textbox id="TBox" title="Sample" text="This is a sample text box">
<cmd id="back_cmd" target="___back"/>
</textbox>
</event>
```

In this example, an event is sent to end users currently viewing the object main_menu in the section which has an id of "1". The event displays the text box TBox to the end users.

The event includes the text box, as well as a back command, allowing end users to return to main_menu when they have finished reading the text box.

The text "This is a sample text box" will be displayed on the mobile device as soon as the event is received by the client application, for example, substantially instantly (milliseconds later), as no time delays have been specified.

However, this example is just for illustration purposes. Events of the invention provide wide-ranging functionality. In certain embodiments, they are used to initiate or propel a quiz or a survey.

Quizzes and Surveys

In certain embodiments, the invention supplies systems and methods for creating quiz-style games. A quiz is a game where a user is presented with questions and receive points for correct answers. Quizzes according to the invention are represented by a quiz content object. A quiz is made up of questions. Questions are created as separate content items. Table 9 lists different types of questions depending on what format the answer is expected to have.

TABLE 9 types of questions

| Question Type | Answer Type |
| --- | --- |
| Date Question | Date input (dd.MM.yyyy HH:mm:ss) |
| Numeric question | Numeric input (integers) |
| Text question | Text input (strings) |
| Multi Choice question | Multi choice input |
| Single choice question | Choice input |

The different types of questions are directly tied to the different kinds of user input recognized by the system. A multiple choice question contains answer alternatives, from which the user must select one or more alternative as the answer. A single choice questions also contains answer alternatives, but the user can only select one of the alternatives as the answer.

The questions are presented according to a quiz schedule. Schedules are also a content item. A quiz schedule is a time schedule for when each question should be displayed. Quizzes can be time-based, with each question being presented at a relative time specified in the schedule (relative to when the quiz is started). Questions can also be presented one after another with no delay in between. Quizzes can also be live. Live quiz games work according to the quiz schedule. The quiz is started at a certain time, and after specified intervals a question is shown to the user. This requires that the schedule is agreed upon beforehand, so that the schedule can be made to display the questions at the correct times. Apart from questions, schedules can also contain quiz text boxes, which can be used to present information or display scores. Schedules can also contain quiz objects items, which can contain one or several content objects. Just like the questions, text boxes and object items are displayed at the time (or in the order) that is defined in the schedule. The actual questions are compiled as input object and sent along with the section where the quiz is specified. The questions are not displayed right away, however, but controlled by the quiz schedule. Whenever a question should be shown to the user, the server sends a quiz event to the mobile application invoking the input object that represents the question. The schedule can either be started automatically at a specific time, or be started manually from the web-interface. Table 10 lists parts of quizzes.

TABLE 10

Quiz parts

| Quiz Item | Description |
| --- | --- |
| Quiz Question | See table above |
| Quiz Schedule | Schedule describing order and timing of quiz items |
| Quiz Text Box | Text box, which can contain text and be displayed in a quiz |
| Quiz Objects Item | Item, which can contain content objects to be displayed at some point in the quiz |

In certain embodiments, the invention provides applications that can be used along with TV game shows, allowing viewers to participate live during the show. By creating a schedule ahead of time, which times the questions with the TV show, the user will be presented with each question at the same time as it is presented on the program. This allows users to compete against each other while watching the show, providing viewers with an interactive experience while watching.

In certain embodiments, the invention also supplies objects for calculating scores and displaying top lists showing which users scored the best in the quiz. Points for questions are specified in each question item. For instance, in a multiple-choice question, each alternative is given a numeric value indicating how many points the alternative is worth. If there is only one correct alternative, and each question is worth one point, the correct alternative would be assigned a value of one point, and all other alternatives a value of zero points. After a quiz has ended, scores are calculated per user, and a top list can be created by comparing scores. The results can be shown to users using either the quiz question results or quiz result list content objects. Both represent a menu, containing results for questions. The results are presented for each question, showing in percentages how many users answered what alternative. The difference is that in a quiz result list, the statistics are displayed as a chart, and in a quiz question results object only numerically. A user's individual information can easily be shown using text variables. Predefined text variables can include, for example: ${user}, ${score}, ${maxscore}, and ${toplist(_schedule( . . . ))}.

The graphical representation of quiz results are done as "pollgraphs". A pollgraph is a displayable content object, representing a graph made up of a number of bars. Depending on settings, the bars can either be horizontal or vertical, and the graph can be set to display percentages (the sum of the all the values each bar represent are 100 percent). Basically, pollgraphs are a graphical representation of voting that can be displayed in real-time. The result shows the percentage of the vote each option has gotten so far.

Quizzes that do not use a timed schedule can be taken offline. Offline quizzes uses separate compilation methods. This is because an offline quiz must be able to run without any interaction with the server, so the questions have to be invoked on the client at the right time, and the final results have to be saved on the client and be sent once the client can connect to the server again. In order to make a quiz work offline, the schedule, section, questions etc. have to be downloaded or saved on the client.

Quiz questions can be presented in a random order. The randomization is done during the final compilation phase, meaning that each user is (potentially) presented the questions in a unique order.

In certain embodiments, systems and methods of the invention provide tools for conduction a survey. A survey is fairly similar to a quiz, as it consists of questions and user supplied answers. The answers are of primary interest to the creator or sponsor of the survey. Surveys can, for instance, be used for market research and statistics gathering. Surveys can be created by using a lot of the same objects and items used in the creation of quizzes. Surveys use the same question and schedule content items as quizzes do. As surveys are not games like quizzes, but instead all about gathering statistics, the scoring features of quizzes are not used. Instead the user is presented with questions according to the schedule and the answers are recorded (just as they are with quizzes). By using access levels for questions, questions can be presented based on how users answered previous questions, which can be used to ask follow-up questions if needed.

As with quiz results and result lists, the answers from all users that have taken a question can be compiled into statistics and displayed either to end-users or retrieved from the server. Survey results can be displayed graphically in the web-interface, using open flash chart, or downloaded as CSV, XML or open flash chart JSON files.

In one exemplary embodiment of the invention, the "quiz" is a client side survey, which uses the schedule with id 1. The quiz content object is a part of a section. The schedule with id 1 is called "survey schedule" and contains three questions. The schedule is stored as a separate content item. Finally, the question with the id 2 is the first question that is displayed. It is a single choice question with two alternatives.

Reports

In certain embodiments, the invention can receive or retrieve data and prepare reports. Reports involve the ability to customize how data from surveys or quizzes is retrieved and output. In certain embodiments, reports are created as XML documents, detailing various options regarding how the data will be printed or presented, as well as allowing a user to select which data to output. A report can contain schedules. Schedules can contain "survey items" and "events", which are form answer items recorded in the database and quiz questions within the schedule.

7. Translations

Real-Time Transformation of Server-Side Content Objects

In order to make the inner app customizable and optimizable on a per-platform (or real-time client response) basis, a "transformation" or translation step exists as part of the multi-phased content preparation process, whereby specific objects that have been authored to be translatable, are changed at runtime during the multi-phase content preparation process according to either an answer provided by the client (e.g. selection of a language), or by an indication of the type of sending device (as identified in e.g. the User Agent Header).

Typical usage for this is to transform widget labels to different languages, or to add or remove a command on a displayable object (e.g. a given command might not be supported on a particular platform).

Other important usage examples of per-platform translation are transforming graphics to different scales as per platform specific screen dimensions, or converting video files into platform specific encodings. This makes it possible to support a wide range of devices for a single server-side authored app.

8. Section Compilation

Content objects exist in sections, the basic quanta of content according to certain embodiments. In certain embodiments, content creation begins the authoring of a source section via the web interface. The source section generally comprises at least one high-level content object.

Source sections comprising high level content objects needs to be compiled in order to be processed by client applications. Compilation replaces high-level objects with low-level objects that can be understood, handled, or displayed directly by client applications.

On the server, sections are either handled as XML data, or parsed into objects. When sections are parsed, all their content (commands content objects, etc.) is parsed as well. XML parsing and writing is handled by the XML framework. Systems and methods of the invention supply a framework to process XML, which utilizes the SAX (Simple API for XML) parser (included as part of the Java software package).

Sections are created on the production server; compiled, and sent on via the gateway server to client applications.

The production server stores its data (apart from resources) in the production database. However, the production application does not have direct access to the core database, where end user data is stored. For this reason among others, section compilation is done in 3 phases; primarily in order to optimize performance by minimizing the amount of content that needs to be compiled separately for individual end users. In phase 1, content associated with data stored in the production database is compiled by the production application. In phase 2, end-user group content, associated with data stored in the core database, is compiled by the gateway application. In phase 3, individual end user content, associated with data stored in the core database, is compiled on an individual/as-needed basis by the gateway application. Each phase is discussed in more detail herein.

As can be seen from the foregoing, systems and methods of the invention provide functionality in the form of quizzes, surveys, and reports. As discussed above, in order to deliver the sizeable and complex content in a reliable and timely manner, systems and methods of the invention provide a multi-phased preparation process that sends only content that is immediately relevant to a client's navigated target. The multi-phased process also sends only content that has changed since the client last loaded it, and ensures that previously prepared content is not needlessly prepared again. Systems and methods of the invention enable real-time push of content to the client, and de-couple client connectivity and content preparation to a great degree, to create reliable interaction and flexibility in the hardware/software configuration.

In certain embodiments, in each scenario of content delivery, as illustrated in FIGS. 1-4, content is prepared in three phases. Phase 1 involves obtaining a source section comprising content and compiling in external data. Phase 2 involves getting the resulting section from phase 1 and compiling in user-generated data and detecting which parts have changed and sending those forward for phase 3. In certain embodiments, phase 2 produces what is called a dynamic section. Phase 3 involves re-compiling the dynamic section for each individual user, while reformatting it into a compiled section consisting of a series of binary packets and simultaneously sending it through a queue to the user.

Each phase is herein discussed in more detail.

Phase 1

In phase 1, content associated with data stored in the production database is compiled by the production application as described in FIGS. 1, 3, and 4. XML source files are reconstructed into compiled dynamic sections, and user-independent high-level objects are replaced by low-level objects where possible. Compiled dynamic sections remain in XML format. Phase 1 compilation is performed when a section is loaded, reloaded, and/or updated, as well as at regular intervals (as part of the production server's general maintenance routines).

The first step of Phase 1 compilation is to copy basic section information to the newly generated compiled section. Then the actual compilation takes place, whereby content objects are complied, and headers for images are generated and inserted. The section is then parsed and content objects are checked and compiled if required. All content objects have their individual compilation methods specified, and each type of object is compiled using that method. Web feeds (RSS, ATOM) are fetched at this point (and checked for updates at regular intervals by the server afterwards) and inserted as ordinary menus and text boxes. This is done only once for all end users and does not create any noticeable load on the server or, for example, to feed providers.

Phase 1 content preparation creates low-level output, in the form of one or more source sections, that is universal to all users of an application, but is not content generated by users (such as chats, comments, etc.). In certain embodiments, phase 1 preparation takes as input XML that has been authored by or for the content producer. This XML contains high level elements that will be transformed into lower level ones by phase 1. An example of this would be an ArticleList element being transformed into a Menu element containing MenuItem, TextBox and Image reference elements.

Sections produced in this phase are stored in memory and Gateways may be registered to receive updates. Phase 1 objects are flushed from memory if they are not currently needed, in order to conserve memory.

By separating the preparation of this data into a separate phase, timely delivery and client response time is optimized as this phase does not have to be repeated for every individually attached client needlessly. Bandwidth and server resources are also conserved.

Phase 1 preparation produces a dynamic section upon which phase 2 operates.

Phase 2

Phase 2 content preparation takes as input the XML output of phase 1 preparation. In phase 2, content that is user generated and can be considered universal to groups of users on the app is prepared. Examples of this kind of content are group chats (all users see the same chat) and public comments. Sections produced in this phase are stored as content objects in memory on the gateway server, where they are available to all registered listeners.

When phase 2 objects are first compiled, they are compared to previous version in memory if they exist. If an object is identified as being changed, new or deleted then this triggers the sending of only those objects to registered listeners. Communication with the client is still at the section level, but the section will only contain the affected objects. These objects will also replace the old ones in memory.

In phase 2, end-user group content, associated with data stored in the end user database, is compiled by the gateway application. Phase 2 compilation is essentially similar to phase 1, but without any image header generation. Phase 2 compilation is performed: after phase 1 compilation; when a content update is required as a part of the synchronization process; when a client application connects to the server, for example by logging on or by requesting content; or at regular intervals. When a client application connects to the server, the dynamic section requested by the app is registered, reloaded, and recompiled prior to download.

The input to phase 2 is a phase 1 compiled source section. Sections being used by a client application are termed "loaded". A section that is active on the gateway is opened as a dynamic section. Dynamic sections check for updates on the production server and are automatically synchronized with the source section, instantly pushing any changes to the client application. Each time an update is made, the dynamic section is recompiled. Phase 2 was created as a way of optimizing the compilation process by reducing the amount of content that needs to be compiled for individual end users.

In one exemplary embodiment according to the invention, a chat is a type of group content that looks the same to all end users, so it can be compiled in Phase 2.

Alternatively, a form is a type of content that contains different data for each individual end user (e.g. nickname, age, and other personal info) and each form needs to be compiled separately. Dynamic sections are prepared to be sent to the end-user client in the final phase of preparation, phase 3. To send a personalized form to an end-user, a generic (or "empty") version of the form would be supplied as a dynamic section, at least one data item individual to that end user would be retrieved from the core database, and the dynamic section plus the individual data item would be compiled into a compiled section in phase 3.

Phase 3

Phase 3 content preparation takes as input the (object) output of phase 2 preparation. In phase 3, content that is generated by individual users and which does not apply to groups of users is prepared. Examples of these individual data items are personal user inputs such as username or age. In addition, access level controls are checked at this stage, and objects which, for example, have been configured to not be visible to a certain user are removed. Phase 3 also finally creates binary artefacts in a packet protocol that is streamed to the client via socket communication (discussed in more detail under "Communication", below).

Individual data items, associated with data stored in the core database, is compiled on an individual/as-needed basis by the gateway application. After phase 2 compilation is completed, objects are split into separate packets to undergo Phase 3 compilation, and any required translations are made, before being delivered to the client application. After compilation and translation, the packets are output ready to be compressed and delivered to the client application.

Phase 3 compilation can be performed when content is sent to a client application, including when an end user connects to the server, or when an update to a section is generated.

The access levels for both the end user and the content object are checked. If the user has access to the object, it is compiled. If not, the request is ignored. Compilation performed in this stage is object specific. If a translation is also needed, this takes place after compilation. Finally, the packets are added to an array, compressed, and sent to the client application.

This step can be optimized and done for every user. During this phase all individual data items are inserted. For example, a form containing personal information like end user name, age, sex etc. would be filled in with the individual's corresponding information as stored in the core database. User-defined web feeds are imported at this point (and checked for updates at regular intervals, on a unique feed basis).

The binary artefacts in the packet protocol created by phase 3 correspond to the individual widgets and other content that constitute a section, and these can exist as Java classes on the server and in equivalent ported format for the various platforms on the client. This is the manner in which the content app is made to be cross-platform.

Phase 3 output is not stored in memory as this data is produced on a per-client basis and is not re-usable by others. The output is put directly to the client's individual delivery queue.

In order to optimize delivery of content to the client, part of the multi-stage content preparation process involves the ability of the server to push changed content or events to individual clients.

As sections are prepared into packets ready to be delivered to the client, these are sent to client delivery queues, one per connected client. A fixed and configurable number of communications manager thread processes execute in the background in order to retrieve packets from these queues and send them to the registered listeners (clients). As a result of this architecture, output from content preparation is de-coupled from client connectivity, i.e. the output production is non-blocked.

In certain embodiments of the invention, plug-ins can be used to add to or modify client applications. If the additional functionality provided by the plug-in requires custom content compilation, this may require all 3 phases of the compilation process. It is also possible to create and/or use a custom compiler for a plug-in. For example, prior to phases of preparation as described above, the server checks for any other registered custom compilers, and runs these first.

9. Communication and Data Format

In certain embodiments, content objects are encoded as proprietary binary packets and are pushed in real-time to the client. This is typically done using a Java socket but can also be done using HTTP. The system contains logic to fall back to HTTP communication if socket communication fails. The HTTP equivalent to a server-side push is simulated using polling from the client side.

In certain embodiments, updates are pushed from the server in real-time. In order to optimize delivery of content to the client, part of the multi-stage content preparation process involves the ability of the server to push changed content or events to individual clients.

As sections are prepared into packets ready to be delivered to the client, these are sent to client delivery queues, one per connected client. A fixed and configurable number of communications manager thread processes execute in the background in order to retrieve packets from these queues and send them to the registered listeners (clients). As a result of this architecture, output from content preparation is de-coupled from client connectivity, i.e. the output production is non-blocked.

In order to optimize reliability of content delivery to the client, part of the multi-stage content preparation and delivery process involves the ability of the client and server to fall back to plain HTTP communication in the event that the regular (preferred) socket communication does not work.

Regular client communication is performed using 2-way communication over a socket connection between the Gateway Server and the (outer) client app. In the event that this connection does not work for whatever reason, it is replaced by a simulated connection over HTTP. This connection is maintained by the client polling a Gateway server HTTPS-ervlet (which is the manner in which content may still be pushed over HTTP).

Systems and methods of the invention provide several independent server applications, a web-interface and mobile clients. Communication between these parts of the system is done either over a Java socket port or HTTP port 80. Both communication protocols are used in order to accommodate differences in both mobile device configurations and the varying reliability of raw socket ports compared to HTTP port 80 communication at various telecoms. All internal server communication between server applications, as well as communication between the web-interface and the servers is done using the socket connection. Communication between the server and the mobile client applications is done over socket if the device supports it and is available at runtime, or otherwise over HTTP. Note also that a fallback mechanism exists, whereby if socket communication fails, the client will attempt HTTP communication via polling to an HTTP servlet on the gateway server.

Whether using a socket port or HTTP port 80 connections, the payload is a binary artefact comprising packets according to a packet protocol supplied by the invention. There are more than fifty different kinds of packets extending the base class, which carry different kinds of information (such as event packets, different kinds of answer packets, content-object packets and so on). The packet format is simple Each packet consist of a small header, containing information about what type of packet it is and what length the packet is. Packets are sent using Java DataOutputStreams, with the packets encoded as byte arrays. The packet format is shown in Table 11.

TABLE 11

Packet format

| Field size | Field name | Field content |
| --- | --- | --- |
| 2 bytes | type | Packet type identifier |
| 4 bytes | length | Payload length(in bytes) |

XML

In certain embodiments, all content is stored in an XML format and much internal communication on the servers uses XML. Systems of the invention provide an XML framework. The framework is implemented using a facade design pattern over the Java SE SAX parser.

Sections are parsed into individual XML elements. Some elements are mandatory for each section, such as a header (containing the section id) and a main object (used as the entry point for the application described in the header). Optional section elements that are parsed are content objects, server objects (high-level objects that are only used on the server), styles and themes, section properties and obfuscating rules.

All objects are then parsed according to methods specific to the object. Object types are identified using integer values. Content objects are first divided according to type, and then the content is parsed further according to methods specific to the type of the object. In reality, the parsing takes all information out of the XML elements and places it in arrays, containing attribute-value pairs. This makes handling objects easier. Content is sent to the clients using this parsed format as binary-encoded packets as shown in the example below.

Communication on the server is mostly done using XML packets. XML packets are written to output/input streams using an XML writer that is a part of the XML framework.

Binary Format

Before packets are sent from the server to the client application, or vice versa, they are transformed into a binary format instead of XML. Packets are sent with an encoding, using the packet format above. XML is not used on the clients, so all content objects are sent as binary packets between the client and the server. An example of a binary "content object" packet looks as follows:

The original XML data:

```
<menu id="menuid" style="menustyle" default_cmd="sel_cmd"
title="My menu">
  <cmd id="sel_cmd" target="___select"/>
  <cmd id="back_cmd" target="___back"/>
  <item id="item0" target="someobject"/>
  <item id="item1" target="anotherobject"/>
  <item id="item2" target="___exit"/>
</menu>
```

After XML parsing, the menu object is made up of an array of menu items, and an array of commands. Each Item and command has an id and a target. The information is then converted to a byte array, and sent using a Java DataOutputStream

| Field size(bytes) | Field description | Field content |
| --- | --- | --- |
| 2 | Packet type | "1" (content object) |
| 4 | Content length | "136" (packet content length in bytes) |
| 2 | Object type | "1" (menu) |
| 2 + 6 | Object id | "6" (length of string) + "menuid" |
| 2 | Menu item count | "3" |
| 2 + 5 | Item[0] id | "5" + "item0" |
| 2 + 10 | Item[0] target | "10" + "someobject" |
| 2 + 5 | Item[1] id | "5" + "item1" |
| 2 + 13 | Item[1] target | "13" + "anotherobject" |
| 2 + 5 | Item[2] id | "5" + "item2" |
| 2 + 6 | Item[2] target | "6" + "_exit" |
| 2 + 7 | Menu title | "7" + "My menu" |
| 2 | Command count | "2" |
| 2 + 7 | Command[0] id | "7" + "sel_cmd" |
| 2 + 8 | Command[0] target | "8" + "_select" |

| Field size(bytes) | Field description | Field content |
|---|---|---|
| 2 + 8 | Command[1] id | "8" + "back_cmd" |
| 2 + 6 | Command[1] target | "6" + "_back" |
| 2 + 7 | Default command | "7" + "sel_cmd" |
| 2 + 9 | Object style | "9" + "menustyle" |

Actual binary packet:
00 01 00 00 00 88 00 01 00 06 6D 65 6E 75 69 64 00 03 00 05 69 74 65 6D 30 00 0A 73 6F 6D 65 6F 62 6A 65 63 74 00 05 69 74 65 6D 31 00 0D 61 6E 6F 74 68 65 72 6F 62 6A 65 63 74 00 05 69 74 65 6D 32 00 06 5F 5F 65 78 69 74 00 07 4D 79 20 6D 65 6E 75 00 02 00 07 73 65 6C 5F 63 6D 64 00 08 5F 5F 73 65 6C 65 63 74 00 08 62 61 63 6B 5F 63 6D 64 00 06 5F 5F 62 61 63 6B 00 07 73 65 6C 5F 63 6D 64 00 09 6D 65 6E 75 73 74 79 6C 65 XML size: 267 bytes Binary size: 142 bytes The multi-phase content preparation process intentionally decouples client connectivity from content preparation, in order to optimize the user experience in terms of client connectivity and interactivity.

If phase 1 has any problems creating new content, the old content stays in memory so that client interactivity is not affected. Indeed, the production application, as hosted for example on a production server or in a production JVM if hosted on the same server as the Gateway(s), can be restarted at will without affecting client navigation and interactivity.

A natural consequence of this is also flexibility for hardware configuration. The Production server can be situated in a place more accessible for the content producer.

10. The Applications

In certain embodiments, the invention provides four applications, each of which can optionally be supplied in a dedicated server: production application; user application; entry application; and gateway application. In certain embodiments, the invention includes a web interface application. Systems and methods of the invention supply the ability to create content, process and compile the content, maintain end-user connectivity, distribute the user (outer) applications, and distribute the compiled content to the user applications.

In certain embodiments, the invention includes four standalone applications which supply different functionality. These applications can be partitioned physically, for example as separate machines or servers, or logically, for example as separate Java virtual machines. In certain embodiments, they can all be run on the same machine and JVM. This logical partitioning of the server allows for scalability. For example, multiple gateways can be configured as required to handle increasing numbers of connected users. The partitioning also allows for updating only parts of the applications or servers at a time, meaning that the entire system does not need to be taken offline for updates. Similarly, a crash in one of the server applications will not cause the entire system to crash.

Internal communication between the different applications is done over TCP/IP, using sockets. All data is sent as packets, using simple packets consisting of a small header and a payload containing data.

Production Application

The production application handles creation and storage of content and resource files (images, video clips, etc.). In certain embodiments, the production application is housed in a dedicated production server, either as a server computer or within a virtual machine. In certain embodiments, the production application controls all other server applications and connects them together. Producers use the production application to create content. The production application handles the phase 1 compilation of sections and imports external contents like web feeds.

In certain embodiments, the production application is a stand-alone application. The application run on an individual server, communicating with the other applications, as well as the web-interface, over TCP/IP. The main responsibility of the production application is to facilitate content creation. The production application is also the central application on the server, connecting the other applications together.

Producers can create content using the web-interface to access the production application. Content is then sent to the production application. The production application handles the incoming content. All the communication (apart from between the producers and the web-interface) is done over TCP/IP socket connections. The content is sent as XML packets using the packet format. The gateway application(s) handles distribution of content to the end-users. The gateway application works as an intermediate link between the production application and the end-users, forwarding requests for content from end-users to the production application or pushing out updated content from the application to the end-user, ensuring that the content is synchronized between the server and the end-users in real-time.

The production application handles all the different kinds of content, including sections. Content is stored by the production application in the production database. In some embodiments, the production application is provided by a production server, and the production database is a component of the production server. All content items are stored in sections. In certain embodiments, sections are stored as XML files. Sections are parsed when handled by the applications. In certain embodiments, there is also some static syntax checking done on sections as they are saved. Resources are also stored in the database.

User groups are used for selective content distribution, allowing content to only be available for end-users that belong to a certain user group. The user groups that are given or denied access to content is defined as access levels for the content whose access should be controlled. Groups can be added, updated and deleted from the production application. The first phase of section compilation is also done on the server. During the first stage of compilation, high-level content is compiled and replaced by low-level content. This includes fetching web feeds and replacing them with textboxes and menus in the section, gathering quiz results, fetching and inserting articles and article lists as well as inserting headers for images and other resources into the section. The production application also handles the system user-producers, using the LDAP protocol. The system user-producers are the producers using the web-interface. Different applications are handled as projects on the production server. In certain embodiments, each project has its own project manager, and a context containing information about the system as seen by that specific project. The context contains the project's specific version of the system configuration, which can be stored as an XML file as well. The context also contains listeners for other parts of the server and managers for the resources, content items, or sections that the project can use.

User Application

The user application handles end-user registration, stores user data and synchronizes the gateways with each other. The user application also handles the sending and receiving of SMSs. The user application handles individual end-user information such as messages. In certain embodiments, the user application is run as an individual user server, communicating with the production server and the gateway server(s) over TCP/IP, as well as handling SMS communication with the end-users. The main responsibilities of the user application is to handle end-users and incoming SMSs.

The user application handles the end-users, who, in a sense, are the mobile devices that run the mobile application. New users initially connect to the entrance application, which redirects the users to a gateway application after the mobile application is downloaded and installed to the end-user device. The user application can then communicate with the end-user via the gateway application, which passes packets between the user application and the end-user. All communication is done over TCP/IP sockets, using the packet format.

Initially, end-users are identified by their phone number, but as soon as a new end-user has installed the mobile application, a new user is registered in the user application. In the system, the users are then identified by an assigned user id. The id and various other information such as registration date, registration info, last log-in time as well as optional information such as nickname, sex and birth date is stored in the database. Optional information is often gathered by an application, and can then be stored in the core database for use in other applications.

When a user connects to the system a session is created, representing the connection. For each session, information is saved, such as ids for the session and the user, login and logout times, as well as the address the user connected from.

Users can belong to any number of user groups. The groups are used to selectively distribute content or events only to select users that belong to a certain group. User groups can be added and edited from the web-interface.

End-users can also send answers of different kinds, such as text answers, images, video files or audio files. The user application receives files and stores them in the appropriate place (for instance, files in the file system, other answers in the database). Many answer types can also be stored as resources and then be used by the application. For example, text answers can be displayed as an answer list to create a chat or comment list or photos can be saved as resources and viewed as photo albums. Users can upload files if the application needs it. The user application handles the uploading and storage of these files. Depending on if the file is an image, a video file, an audio file or some other kind of file, the user application creates appropriate folders, tables, or variables for these different kinds of files in the file system or database and stores uploaded files there.

The access level controls which user has access to what. Most objects can have an access level; content objects, articles, events and so on. The access level provides a very powerful way to allow or deny access depending on the user, group time or whatever. The access level contains a number of access rules that are applied in ascending order. Users are matched with the rules and are denied or allowed when they match which in the end makes a very flexible way how to give and deny access to different items.

Entry Application

The entrance application (or "entry application") handles the load balancing between the gateways and redirects the users to the gateways. The mobile application is downloaded from the entry application.

The entrance application allows client mobile devices to receive the mobile application. In certain embodiments, the entrance application is run as an individual server, communicating with the production application over TCP/IP, and with the end-users over HTTP. The main responsibility of the entrance application is to handle the distribution of the mobile application.

The entrance application handles the distribution of the mobile application. The end-user typically will order an application by sending a registration SMS to a phone number. The device is then identified using the user agent HTTP header (this is not always possible, meaning that some users can not be identified, either because of the device or interfering systems used by the operator). When identification is possible, the entrance server registers a new user with the user application (if the user does not already exist), and generates a ticket which identifies the registration and the user. The ticket consists of a unique numerical id and a random pass phrase, which is generated. Using the ticket, a unique download URL is generated for the user, and sent back to the end-user in an SMS. By following the download link, the user can then download and install the appropriate version of the mobile application to the device.

Once the mobile application is installed, the mobile application then contacts the entrance server. The entrance server then responds with one or more addresses for gateway servers, redirecting the communication to the gateways. By controlling the addresses to the gateway servers, the entrance application can effectively balance the load on the gateways. In certain embodiments, different gateway addresses are stored in a MIDlet JAD-file, indicating which gateways are set up to handle that specific application.

Gateway Application(s)

The gateway application handle the end users, sending them the content and receiving incoming data from them. The system can contain any number of gateways, which makes it scalable to a large number of users. The gateways keep track of each connected user in a very secure and detailed way. In certain embodiments, one or more gateways are run as one or more individual servers, or within one or more virtual machines.

The gateway application sends compiled sections to mobile devices. In certain embodiments, the application is run as an individual server, communicating with the other applications over TCP/IP. The gateway can also communicate with the end-users over the appropriate protocol, which depends on the device (TCP/IP or HTTP). The main responsibility of the gateway application is to handle the connection and communication with the other server applications and the end-users.

The gateway application handles nearly all communication with the end-users, as well as communication with the production application, the user application, and the core database. Some communication with the end-users is also done by the entrance application, like distribution of the mobile application. Communication with the end-users is done over TCP/IP socket connections when possible, or alternatively over HTTP depending on the end-user device. The gateway upholds the connection to the end-users, and keeps track of all connected users.

The gateway application handles sending and receiving data to or from the end-users, ensuring that the correct user gets the correct data, and trying to eliminate any redundant data being sent to users. All communication is done as packets, using the packet format. The gateway application is scalable. Many instances of the gateway application can be run at the same time if the need arises. The user application handles synchronization between the gateways. Sections are compiled further in the gateway, producing the final XML that is sent to the end-user. The sections are compiled in two more phases here, compiling high-level objects that are user specific into low-level objects that can be displayed on the end-user device. The final, compiled XML contains no high-level objects, only low level objects that can be directly displayed as screens on the end-user device.

Web-Interface

The web-interface is a standalone web-application that is used for adding and editing content. The web-interface communicates only with the production application, and is used as the interface between producers and the server.

FIG. 5 illustrates how Producers, End-Users, and the various Applications/Servers collaborate.

The web-interface can be accessed from anywhere using a web browser. Using the web-interface, it is possible to add, manage, delete and edit content, which in turn is organized under a specific project.

The web-interface contains a content manager, which can be user to add new articles, quiz items or quiz schedules, as well as to view any existing content items. Since certain content such as articles can be generated automatically from feeds, the content manager is also a nice interface for viewing and editing generated articles, as well as for controlling different content categories (articles and quiz questions can optionally belong to a category). It is also possible to create and edit quiz questions in a graphical way, making it easier to create new quizzes and surveys by, for example, supplying the option of defining conditional questions. Such questions are only shown as follow-up questions, based on how a user answered a previous question.

11. Databases

In certain embodiments of the invention, data is stored using SQL databases. In certain embodiments, the only exception is the resource files, which are stored directly in the file system. In certain embodiments, there are two databases, a production database (sometimes referred to as a projects database) and a core database.

In certain embodiments, the production database is a construct encompassing two or more databases. In certain embodiments, the production database comprises project databases, wherein each project database corresponds to one project. Each project can use different databases (i.e., its corresponding project database) and these can be placed all on the same server or spread out to different servers.

The core database contains data for users, groups, individuals, end user data (phone number, nickname, user-generated data, etc.), end user session logs, and SMS logs. The production database (used by the production application) contains content, such as configurations, sections, content items, resources, themes and so on.

12. Commands, Targets, Invocable Objects and Macros

In certain embodiments, the invention provides targets and invocable objects that run on mobile devices. In certain embodiments, the invention provides commands. Commands are similar to MIDP command objects, but offer additional functionality. In addition to the visual presentation of the command, type and priority can also be specified.

Certain other platforms, such as Android and iPhone, don't include commands as a native feature, so the invention provides its own commands to run on platforms such as these.

When activated, a command invokes a target, which is either an invocable content object, or a macro describing some special action.

If the target is the id of an invocable object, the object is invoked and the appropriate action is taken. In certain embodiments, the action could include displaying a displayable object on screen, playing an audio or video clip, uploading a photo, or sending an SMS.

An invocable object is an object that can be invoked. Each invocable object contains information on how it can be invoked, which can be uniquely identified. User interaction in client applications is enabled by invocable commands attached to displayable objects displayed on the mobile device screen. Commands can also be attached to non-displayable objects such as menu items and item objects. Depending on the mobile device, user interactions are performed in different ways. For example, some devices use touchscreens as input devices, other devices use buttons. End user interaction can be tailored to different mobile devices.

Command objects do not by themselves contain information about their targets. This information is specified in the displayable (object) associated with the command. Commands can be included in menus, command bars, or mapped directly onto buttons.

When defining commands in a section, commands are allocated priorities, allowing the client application to gauge their relative importance. Commands are sometimes handled differently on different mobile devices, so the look and feel of a client application can vary somewhat, and end user interaction can be tailored for each device.

Active commands are associated with displayable objects currently on-screen. Any number of commands can be active at the same time.

Invocable Objects include displayable objects, input objects, quiz/survey objects, composite targets, and platform requests. Displayable object refers to a content object that can be displayed on a mobile device as either a screen or a canvas, and can generate a command for user input. An input is an object generated via end user input, such as text, image, or an audio clip. Quizzes and surveys are special content objects containing questions for quiz-type games, statistics gathering or market research. A composite target allows multiple actions to be performed by a single command. A platform request invokes platform requests, which could include, for example, opening a web browser.

In some embodiments, the invention provides macros. A macro is used to describe hardware functions or internal logic on a device, and can be invoked by commands.

If the target is a macro, the macro is executed. This could, for example, flash the backlight or cause vibrating, returning to the previous displayable object (logical back), or similar. Macros are an abstraction layer to native mobile functions. The use of macros allows single sections and contexts to be used across a wide range of mobile devices, though the actual handling of macro commands is performed separately on each device.

Macros are used for hardware-related commands such as controlling screens and navigation, GPS, connectivity, audio, backlights, vibration and memory; as well as for some logical functions. For example, "run target" could be a macro that executes a target in a separate thread on the client application. This is useful for executing functions that might lock up the device or similar. Macros can run on the server as an abstract construct describing functionality on the client application.

INCORPORATION BY REFERENCE

Systems, methods, and devices of the invention are also described in U.S. patent application Ser. No. 13/647,824, filed Oct. 9, 2011, and also claiming priority to U.S. Provisional 61/391,272, filed Oct. 8, 2010, by the same inventors and titled SCALABLE SYNCHRONIZATION OF EVENTS AMONG SERVER AND CLIENTS WITH VARYING LAG-TIMES, which is herein incorporated by reference in its entirety.

Systems, methods, and devices of the invention are also described in U.S. patent application Ser. No. 13/269,241, filed Oct. 7, 2011, under and also claiming priority to U.S. Provisional 61/391,272, filed Oct. 8, 2010, by the same inventors and titled MULTI-PHASED AND PARTITIONED CONTENT PREPARATION AND DELIVERY, which is herein incorporated by reference in its entirety.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for distributing a content application comprising:
   a production server coupled to a web interface and configured to allow, via the web interface, a producer to create a content application comprising functionality;
   a gateway server comprising a memory, one or more processors, and an input device, in communication with the production server and configured to receive a client application and the content application, and wherein the one or more processors are configured to:
      assemble, based on the client application, a mobile application and a second mobile application; and
      compile the content application into a compiled content app and a second compiled content app;
   a mobile device configured to receive and install the mobile application and receive and execute the compiled content app such that the compiled content app provides the functionality to an end-user; and
   a second mobile device distinct from the mobile device and configured to receive and install the second mobile application and receive and execute the second compiled content app, such that the second compiled content app provides the functionality to a second end-user.

2. The system of claim 1, further wherein the web interface allows a producer to change the functionality to created modified content application comprising a modified functionality, thereby causing the one or more processors to, in real-time:
   receive the modified content application and compile it into a modified compiled content app; and
   send the modified compiled content app to the mobile device thereby causing the mobile device to, in real-time, execute the modified compiled content app such that the modified compiled content app provides the modified functionality to the end-user.

3. The system of claim 1 wherein the one or more processors are further configured to:
   transform the content application and substantially simultaneously compile the transformed content application into a transformed compiled content app; and
   send, substantially simultaneously with the transforming and the compiling, the transformed compiled content app to a third mobile device thereby causing the third mobile device to, in real-time, execute the transformed compiled content app such that the transformed compiled content app provides a translated version of the functionality to a third end-user.

4. An apparatus for distributing a content application, the apparatus comprising:
   a memory;
   an input device in communication with the memory and configured to receive a client application and a content application comprising functionality;
   one or more processors in communication with the input device and the memory and configured to:
      save the content application in the memory;
      assemble, based on the client application, a mobile application and a second mobile application;
      send the mobile application to a mobile device to be installed and the second mobile application to a second mobile device to be installed;
      compile the content application into a compiled content app capable of being executed by the installed mobile application such that the compiled content app can deliver the functionality to an end-user; and
      compile the content application into a second compiled content app capable of being executed by the installed second mobile application such that the second compiled content app can deliver the functionality to a second end-user.

5. The apparatus of claim 4, wherein the one or more processors are further configured to:
   send, responsive to the compiling step, the compiled content app to the mobile device; and
   send the second compiled content app to the second mobile device.

6. The apparatus of claim 4, further comprising a core database, the core database comprising a group data item and an individual data item and further wherein the one or more processors are further configured to:
   write the content application and the group data item into a dynamic section; and
   compile the dynamic section into the compiled content app.

7. The apparatus of claim 6, wherein the one or more processors are further configured to:
   compile the dynamic section and the individual data item into an individual compiled content app capable of being executed by the installed second mobile application such that the individual compiled content app can deliver an individualized form of the functionality to the second end-user.

8. The apparatus of claim 4 wherein the mobile device comprises a platform and the second mobile device comprises a second platform distinct from the platform and selected from the list consisting of: Java ME; iPhone; iOS; iPad; Android; Windows Mobile; Windows Phone; Blackberry OS; Symbian and bada.

9. The apparatus of claim 5 wherein the functionality comprises a question and an input prompt and wherein the one or more processors are further configured to:
   compile, substantially simultaneously with the receiving of the content application by the input device, the content application into a compiled content app resulting in the compiled content app being executed by a plurality of mobile applications such that each mobile application can deliver, in real-time, to a separate end-user the question and the input prompt.

10. The apparatus of claim 4 wherein:
the functionality comprises the display of an element and the navigation from a screen to a second screen;
the content application comprises a Java SE class corresponding to the display and a second Java SE class corresponding to the navigation;
the compiled content app comprises a Java ME class corresponding to the display and a second Java ME class corresponding to the navigation; and
the second compiled content app comprises an Objective-C class executable corresponding to the display and a second Objective-C class executable corresponding to the navigation.

11. The apparatus of claim 5 wherein the compiled content app and the second compiled content app each consist of a plurality of binary packets, each plurality of binary packets comprising the functionality.

12. The apparatus of claim 6 wherein the one or more processors are further configured to:
cause a plurality of mobile devices to each substantially simultaneously receive input from one of a number of users;
receive, from the plurality of mobile devices, the inputs;
aggregate the inputs to create an aggregate result;
store the aggregate result as a second group data item in the core database;
create a displayable object comprising the aggregate result; and
cause each mobile device to display the displayable object.

13. The apparatus of claim 5 wherein the functionality includes an alteration to an immediately preceding functionality and wherein the sending the compiled content app to the mobile device causes the mobile application to replace the immediately preceding functionality with the functionality.

14. A method for distributing a content application, the method comprising:
receiving, by means of a computer comprising an input device, one or more processors, and a memory, a client application and a content application comprising functionality;
saving the content application in the memory;
assembling, by means of the one or more processors and based on the client application, a mobile application and a second mobile application; and
sending the mobile application to a mobile device to be installed and the second mobile application to a second mobile device to be installed;
compiling the content application into a compiled content app capable of being executed by the installed mobile application such that the compiled content app can deliver the functionality to an end-user; and
compiling the content application into a second compiled content app capable of being executed by the installed second mobile application such that the second compiled content app can deliver the functionality to a second end-user.

15. The method of claim 14, further comprising, responsive to the compiling step:
sending the compiled content app to the mobile device; and
sending the second compiled content app to the second mobile device.

16. The method of claim 14, further comprising:
storing, in a core database, a group data item and an individual data item;
writing the content application and the group data item into a dynamic section; and
compiling the dynamic section into the compiled content app.

17. The method of claim 16, further comprising:
compiling the dynamic section and the individual data item into an individual compiled content app capable of being executed by the installed second mobile application such that the individual compiled content app can deliver an individualized form of the functionality to the second end-user.

18. The method of claim 14 wherein the mobile device comprises a platform and the second mobile device comprises a second platform distinct from the platform and selected from the list consisting of: Java ME; iPhone; iOS; iPad; Android; Windows Mobile; Windows Phone; Blackberry OS; Symbian and bada.

19. The method of claim 15 wherein the functionality comprises a question and an input prompt and further comprising:
compiling, substantially simultaneously with the receiving of the content application by the input device, the content application into a compiled content app resulting in the compiled content app being executed by a plurality of mobile applications such that each mobile application can deliver, in real-time, to one of a number of end-users, the question and the input prompt.

20. The method of claim 14 wherein:
the functionality comprises the display of an element and the navigation from a screen to a second screen;
the content application comprises a Java SE class corresponding to the display and a second Java SE class corresponding to the navigation;
the compiled content app comprises a Java ME class corresponding to the display and a second Java ME class corresponding to the navigation; and
the second compiled content app comprises an Objective-C class executable corresponding to the display and a second Objective-C class executable corresponding to the navigation.

21. The method of claim 15 wherein the compiled content app and the second compiled content app each consist of a plurality of binary packets, each plurality of binary packets comprising the functionality.

22. The method of claim 16 further comprising:
causing a plurality of mobile devices to each substantially simultaneously receive input from one of a plurality of users;
receiving, from the mobile devices, the inputs;
aggregating the inputs to create an aggregate result;
storing the aggregate result as a second group data item in the core database;
creating a displayable object comprising the aggregate result; and
causing each mobile device to display the displayable object.

23. The method of claim 15 wherein the functionality includes an alteration to an immediately preceding functionality and wherein the sending the compiled content app to the mobile device causes the mobile application to replace the immediately preceding functionality with the functionality.

* * * * *